United States Patent [19]

Kurashige et al.

[11] Patent Number: 4,911,552
[45] Date of Patent: Mar. 27, 1990

[54] DIGITAL SIGNAL PROCESSING CIRCUIT FOR DIGITAL CAMERA

[75] Inventors: Tadamasa Kurashige; Takashi Nakamura, both of Kanagawa, Japan

[73] Assignee: Sony Corp., Tokyo, Japan

[21] Appl. No.: 249,008

[22] Filed: Sep. 26, 1988

[30] Foreign Application Priority Data

Sep. 30, 1987 [JP] Japan ................................ 62-247092

[51] Int. Cl.$^4$ .......................... H04N 9/73; H04N 9/07
[52] U.S. Cl. ......................................... 358/41; 358/55; 358/21 R; 358/29 V; 358/160
[58] Field of Search .................... 358/41, 55, 21, 29 C, 358/27, 161, 168, 169, 170, 227, 228, 160

[56] References Cited

U.S. PATENT DOCUMENTS 4,805,010  2/1989  Shroyer et al. ...................... 358/29
4,814,864  3/1989  Pritchard .............................. 358/29

Primary Examiner—James J. Groody
Assistant Examiner—Robert M. Bauer
Attorney, Agent, or Firm—Alvin Sinderbrand

[57] ABSTRACT

A digital detecting or charge-discharge control circuit is useful in a video camera as a peak detector in an automatic iris control circuit, as a reference voltage generator in an automatic white balance control circuit and/or as a low pass filter in an automatic black balance control circuit. The digital detecting circuit includes multipliers for multiplying by first and second coefficients which determine charging and discharging times, respectively, and the value of such first and second coefficients are controlled or varied in accordance with the selected operating mode of the camera so that broad ranges of iris, white balance and/or black balance control can be achieved.

22 Claims, 18 Drawing Sheets

DIGITAL SIGNAL PROCESSING CIRCUIT FOR DIGITAL CAMERA

BACKGROUND OF THE INVENTION

1. Field of the Invention

This invention relates generally to color video cameras, and more particularly is directed to circuits for automatically controlling characteristics of the camera, for example, for exercising automatic iris, white balance and/or black balance controls.

2. Description of the Prior Art

In general, the white portion of a picture obtained with a color video camera is maintained constant by means of a white balance correction or control even if there is a change in the color temperature of the light source illuminating the object in the field of view of the camera. Although it is well known to effect a manual correction or control of the white balance while a sheet of white paper or the like is held in the field of view of the camera, more expensive or technically sophisticated color video cameras usually provide automatic correction of the white balance. In the existing automatic white balance correction circuits, the brightest portion of an object or picture in the field of view is presumed to be white and is detected to generate a corresponding gating pulse during which the amplitudes of the red, green and blue color signals being generated by the camera are made equal to each other. More specifically, the gating pulse is usually generated by equally adding the red, green and blue color signals obtained from the image device of a color video camera, and comparing the resulting added signal with a so-called semi-peak voltage which is generated by the use of a diode clamp circuit effecting a predetermined reduction from the peak voltage level of the added color signal. However, since objects normally in the field of view of the camera do not usually include substantial pure white portions, or the white portions may have yellow areas included therein, the gating pulse may be generated, not only in response to truly white portions, but also in response to comparable bright portions of the object in the field of view. Therefore, precise white balance correction may not be realized.

In known automatic iris control circuits, a peak detector having a diode and a capacitor is employed for obtaining exposure data, that is, data indicating the amount of light incident on the image pick-up device of the video camera. However, the characteristic of such peak detector depends on the characteristics of the diode and capacitor so that the operating mode of the automatic iris control is variable only within a relatively narrow range, that is, the lighting conditions under which the video camera can be used are narrowly limited.

Although it is known to also effect black balance control of a color video camera, the provision of a color video camera with aromatic iris, white balance and black balance controls requires a complex circuit arrangement which is difficult to incorporate in an integrated circuit.

OBJECTS AND SUMMARY OF THE INVENTION

Accordingly, it is an object of the present invention to provide a video signal processing circuit, for example, for effecting automatic iris control, white balance control or black balance control in a color video camera, and which avoids the foregoing problems of the prior art.

More specifically, it is an object of this invention to provide an automatic white balance control circuit capable of effecting precisely accurate white balance corrections.

Another object of the invention is to provide an automatic white balance control circuit that can accurately generate a gating pulse corresponding to a white portion of an object in the field of view of the camera, and the width of which can be made variable in accordance with different modes or conditions of use of the color video camera.

Still another object of the invention is to provide an automatic white balance control circuit that can generate a gating pulse based on a reference voltage which is appropriate to the selection of a white portion of the object in the field of view even if there is a poor correlation between odd and even fields of the video signal.

Still another object of the invention is to provide an automatic white balance control circuit which detects only truly white portions of an object in the field of view for generating a gating pulse, and which avoids detection of grey portions of such object.

A further object of the invention is to provide an automatic iris control circuit which can provide an automatic control operation that is appropriate to the light and other conditions encountered when using the color video camera.

A still further object of the invention is to provide an automatic iris control circuit that can maintain a selected brightness of the video picture obtained by operation of the color video camera.

A still further object of the invention is to provide an automatic iris control circuit of reduced size by including therein a circuit for thinned-out sampling of the exposure data.

Moreover, it is an object of this invention to provide a color video camera with an automatic control circuit having modes for effecting iris control, white balance control and black balance control, respectively, and which is of reduced size, for example, by employing some of the circuit components in two of such modes.

In accordance with an aspect of this invention, a video signal processing circuit comprises video signal control means for varying a characteristic of a video signal, for example, by effecting automatic iris control, white balance control or black balance control of a color video camera; a detecting circuit receiving an input from the video signal control means for providing an output in correspondence to such video signal; and control signal generating means connecting to the detecting circuit for generating a control signal for the video signal control means in response to the output from the detecting circuit; such detecting circuit including comparator means for comparing the input and output of the detecting circuit and providing a comparison output in accordance therewith, first multiplying means responsive to the comparison output for multiplying the input by a first coefficient and thereby providing a first product output, adding means for adding the first product output to the output of the detecting circuit so as to provide an added output, second multiplying means for multiplying the added output by a second coefficient so as to provide the output of the detecting circuit as the product of the added output and the second coefficient, and means for controlling the amounts or values of the first and second coefficients.

In accordance with another aspect of this invention, an automatic control circuit having modes for effecting iris control, white balance control and black balance control, respectively, of a color video camera which provides three primary color signals comprises: first, second and third detecting circuits having respective inputs and outputs and each including a comparator for comparing the respective input and output and providing a comparison output in accordance therewith, a first multiplier responsive to the comparison output for multiplying the respective input by a first coefficient and providing a first product output, an adder for adding the first product output to the respective output of the detecting circuit so as to provide an added output, a second multiplier for multiplying the added output by a second coefficient so as to provide a second product output as the respective output of the detecting circuit, and means for controlling the amounts of the first and second coefficients; a non-adder-mixer receiving the primary color signals and extracting therefrom the one of the primary color signals having the largest amplitude; means operative in the iris control mode for applying the primary color signal of largest amplitude from the non-adder-mixer as the input to the first detecting circuit which then functions as a peak detecting circuit; means operative in the white balance control mode for adding together the three primary color signals and applying the resulting added signal to the second detecting circuit as the input of the latter whereupon the second detecting circuit functions as a reference voltage generating circuit; and means operative in the black balance control mode for applying the three primary color signals as the inputs to the first, second and third detecting circuits, respectively, which function, in the black balance control mode, as first, second and third low pass filters, respectively.

The above and other objects, features and advantages of the present invention, will be apparent in the following detailed description of preferred embodiments thereof, particularly when read in connection with the accompanying drawings in which corresponding parts and components are identified by the same reference numerals in the several views.

DETAILED DESCRIPTION OF THE PREFERRED EMBODIMENTS

Figure 1:
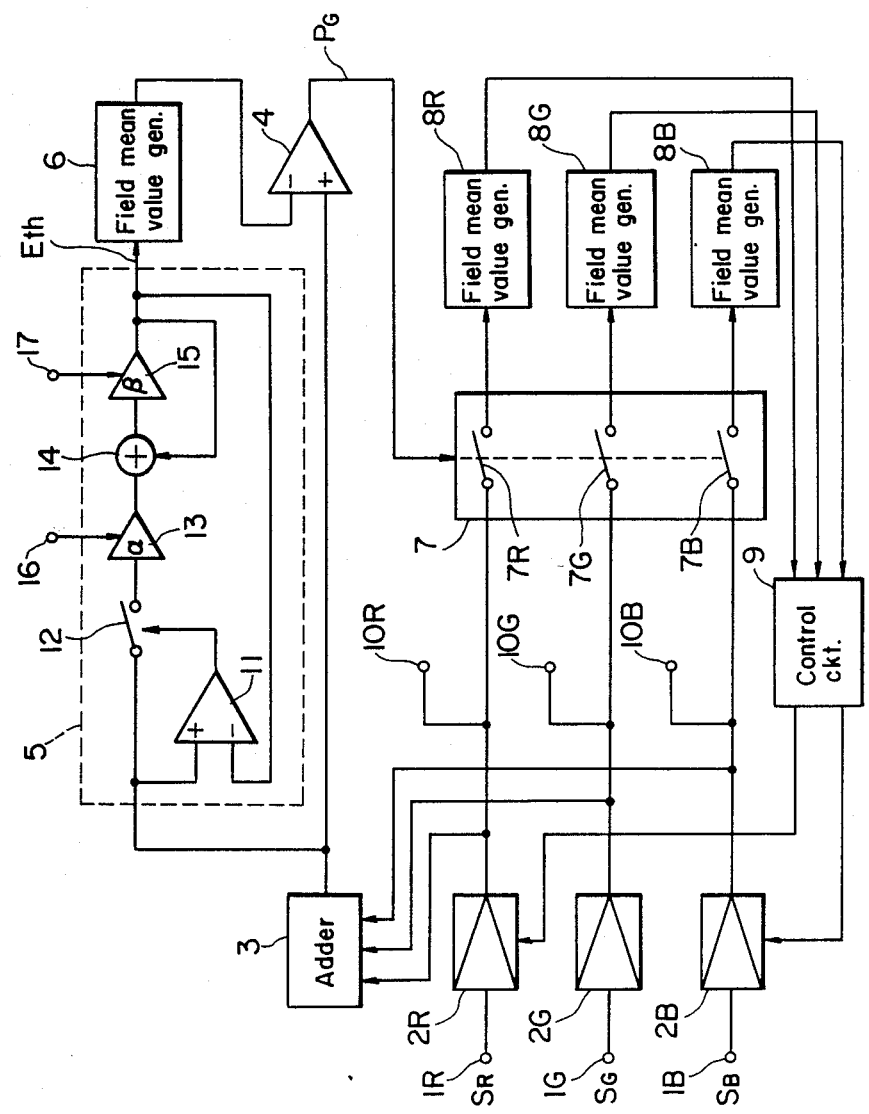
FIG. 1 is a circuit diagram of an automatic white balance control circuit for a color video camera in accordance with an embodiment of this invention.

Referring to the drawings in detail, and initially to FIG. 1 thereof, it will be seen that a video signal processing circuit according to an embodiment of the present invention is there shown incorporated in a white balance correction circuit for a color video camera in which digital primary color signals $S_R$, $S_G$ and $S_B$ are applied to input terminals 1R, 1G and 1B, respectively. The digital primary color signals $S_R$, $S_G$ and $S_B$ are supplied from the respective input terminals through variable gain amplifiers, or variable attenuators 2R, 2G and 2B, respectively, to an adder 3 in which the primary color signals are added equally to each other. The resulting added signal from adder 3 is applied too one input, for example, the non-inverted input, of a comparator 4. The added signal from adder 3 is also applied to the input of a detecting or charge-discharge circuit 5 which, in this instance, functions as a reference voltage generator, and the output or reference voltage $E_{th}$ from such circuit 5 is applied to a mean value generating circuit 6 which generates a mean value of the output of the circuit 5 over one field period of the video signal. The field mean value from the circuit 6 is applied to the other or inverted input of the comparator 4 so that the latter provides a gating pulse $P_G$ whenever the added output from adder 3 is greater then the field mean value of the reference voltage from circuit 5. Such gating pulse from comparator 4 is used to detect an approximate peak level of the added signal obtained by equally adding the red, green and blue color signals from the variable gain amplifiers 2R, 2G, 2B.

Figures 2A, 2B, 2C:
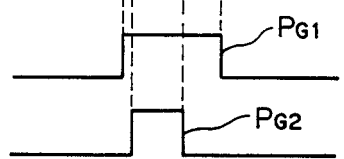
FIGS. 2A-2C are waveforms to which reference will be made in explaining the generation of a gating pulse in the automatic white balance control circuit in FIG. 1.

The reference voltage $E_{th}$ generated by circuit 5 is a predetermined voltage lower then the peak voltage level $L_{pk}$ of the added output signal from the adder 3 (FIG. 2A). As will be later described in detail, the reference voltage $E_{th}$ may be changed, for example, from one to the other of the levels $E_{th1}$ and $E_{th2}$ shown in FIG. 2A, in response to changes in the selected mode of operation of the associated color video camera. If the reference voltage is at the level $E_{th1}$, the resulting gating pulse from the comparator 4 is as shown at $P_{G1}$ on FIG. 2B, whereas, if the reference voltage is at the level $E_{th2}$ on FIG. 2A, the gating pulse $P_{G2}$ shown in FIG. 2C is generated.

The primary color signals from the variable gain amplifiers 2R, 2G and 2B are also supplied through respective gates or switches 7R, 7G and 7B of a gate switching circuit 7 to field mean value generating circuits 8R, 8G and 8B, respectively. The gating pulse $P_G$ from the comparator 4 is applied to the gate switching circuit 7 so as to simultaneously close or gate the switches 7R, 7G and 7B during the period of the gating pulse. In other words, the red, green and blue color signals from the variable gain amplifiers 2R, 2G and 2B are gated by the gating pulse $P_G$ and then field mean averaged by the circuits 8R, 8G and 8B, respectively. The resulting gated and field mean averaged red, green and blue color signals are supplied to a control circuit 9 which may be constituted by a central processing unit (CPU), and in which the voltage levels of the red and blue color signals are compared with the voltage level of the green color signal and, in accordance therewith, white balance correction data are generated and supplied to the variable gain amplifiers 2R and 2B, during vertical blanking periods, for varying the gains of such amplifiers so as to equalize the levels of the red and blue color signals from the amplifiers 2R and 2B with the level of the green color signal from the amplifier 2G. Finally, the white balance corrected color signals derived from the outputs of the variable gain amplifiers 2R, 2G and 2B are applied to output terminals 10R, 10G and 10B, respectively.

In the embodiment of the invention illustrated on FIG. 1, the detecting or charge-discharge control circuit 5 for generating the reference voltage $E_{th}$ is shown to include a comparator 11 which receives the output of the adder 3 and the output of the circuit 5 at the non-inverted and inverted inputs, respectively, of comparator 11 so that the latter compares the levels of the input and output signals of the circuit 5 and provides a gating signal controlling a switch or gate circuit 12. The switch circuit 12 gates the input of detecting circuit 5 to a first multiplier 13 in which the signal gated through switch circuit 12 when the latter is closed is multiplied by a first coefficient $\alpha$. An adder 14 adds the output of the detecting circuit 5 to the output of the first multiplier 13, and the output of the adder 14 is supplied to a second multiplier 15 to be multiplied in the latter by a second coefficient $\beta$. The coefficients $\alpha$ and $\beta$ for use in the multipliers 13 and 15, respectively, are suitably changed in response to control signals supplied from terminals 16 and 17, respectively.

When the detecting circuit 5 has the above described circuit arrangement and is employed for generating a reference voltage, the switch or gate circuit 12 is closed whenever the input of the circuit 5 is larger than its output and, in that event, the input of circuit 5 is multiplied by the first coefficient $\alpha$ and the resulting multiplied signal or product output from multiplier 13 is added to the output of the circuit 5 by the adder 14. Then, the added output from adder 14 is multiplied by the second coefficient $\beta$ in the second multiplier 15 to provide the output of circuit 5 which is supplied to the adder 14. The value of the first coefficient $\alpha$ is much smaller then 1 and it corresponds to, for example, a charging time constant in an analog charge-discharge circuit. Thus, when the input level of the circuit 5 is larger then its output, the output level of the adder 14 increases at a rate or inclination corresponding to the value of the coefficient $\alpha$ because the input of the circuit 5 is accumulated by the adder 14 $\alpha$ times during each clock. The value of the second coefficient $\beta$ is selected to be only very slightly less than 1, for example, 0.99, and corresponds to the discharging time constant of an analog charge-discharge circuit. Thus, when the switch circuit 12 is open as a result of the output of the circuit 5 being at a higher level then the input of that circuit, the output level of the circuit 5 decreases at a rate corresponding to the value of $\beta$ in the manner of a geometric series. Since the coefficients $\alpha$ and $\beta$ are changeable in response to the control signals from terminals 16 and 17, respectively, the equivalent charging and discharging time constants can be adjustably set for obtaining the reference voltage $E_{th}$ at an adjusted level, for example, at the level $E_{th1}$ or $E_{th2}$ on FIG. 2A. As earlier noted, adjustably setting the reference voltage at the level $E_{th1}$ or $E_{th2}$ results in gating pulses as shown at $P_{G1}$ or $P_{G2}$ on FIGS. 2B and 2C, respectively. The changes in the reference voltage can be suitably made to occur in response to changes in the shooting mode of the color video camera. More specifically, the gating pulse $P_{G1}$ (FIG. 2B) obtained with the reference voltage $E_{th1}$ may be used when an object in the field of view of the camera has a white portion making up a major proportion of its area, whereas, the gating pulse $P_{G2}$ (FIG. 2C) corresponding to the reference voltage $E_{th2}$ may be advantageously used if the object in the field of view of the camera has a white portion that is only a minor proportion of its total area, or if a major proportion of the object is a mixture of yellows and white. In either case, the operator of the camera can select a shooting mode appropriate to the object in the field of view of the camera and thereby obtain values of $\alpha$ and $\beta$ for achieving the most desirable level of the reference voltage $E_{th}$.

Figure 3:
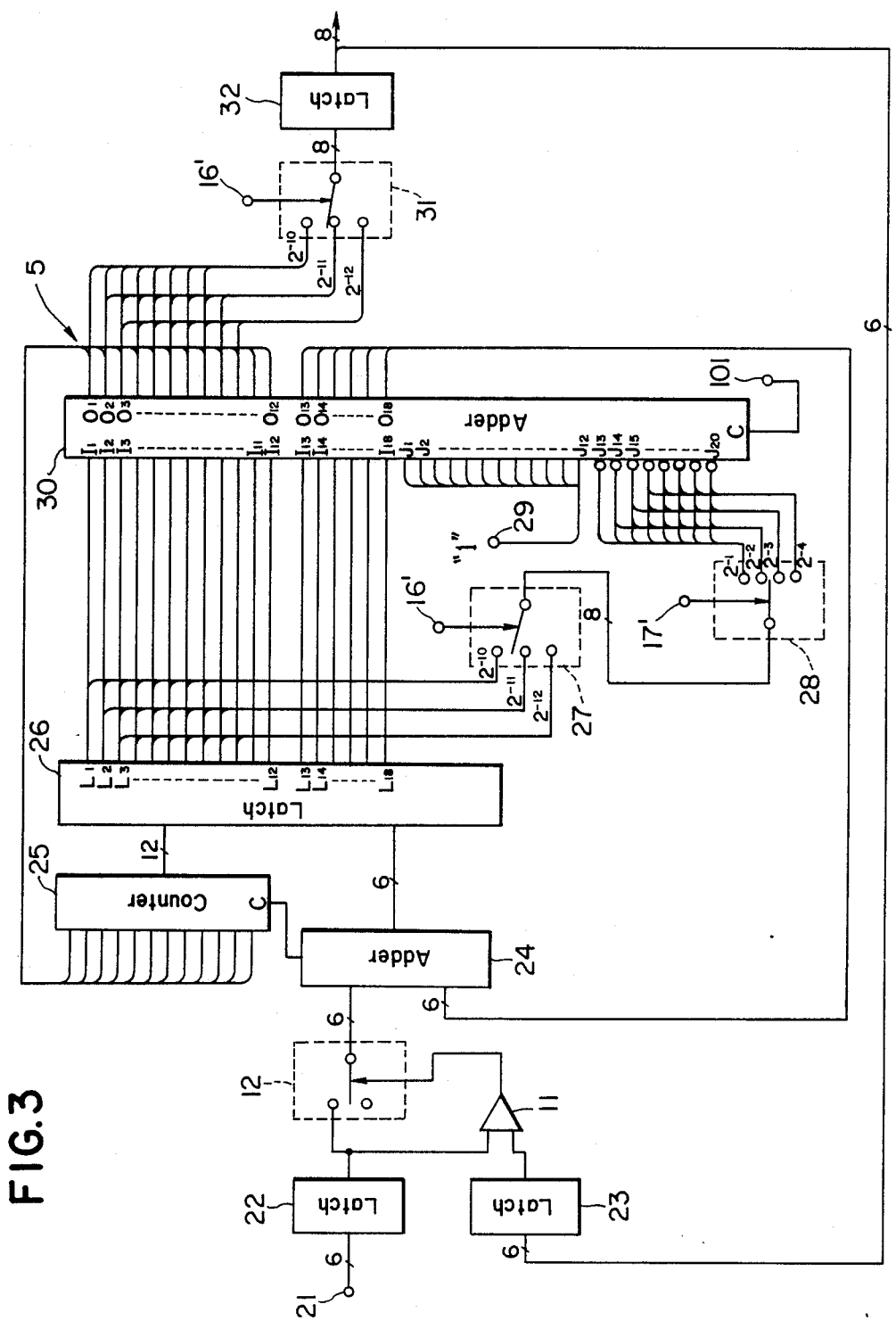
FIG. 3 is a circuit diagram illustrating details of a digital reference voltage generating circuit included in the automatic white balance control circuit of FIG. 1.

Referring now to FIG. 3, it will be seen that, in a preferred actual construction of the reference voltage generating circuit 5 described above with reference to FIG. 1, the added output from adder 3 in which the red, green and blue color signals are equally added, is applied through a terminal 21 to a latch circuit 22. The output of the latch circuit 22 is supplied to the non-inverted input of the comparator 11 and to the switch circuit 12 which is controlled in response to the output of the comparator 11 so as to selectively connect or disconnect the output of the latch circuit 22 in respect to an input of an adder 24. The output of the circuit 5 is fed back to a latch circuit 23 having its output connected to the other or inverted input of the comparator 11. In the particular circuit arrangement of FIG. 3, the adder 24, a counter 25, a latch circuit 26, selectors 27 and 28, an adder 30, a selector 31 and a latch circuit 32 connected in the illustrated manner correspond to the circuit comprised of the multiplier 13, the adder 14 and the multiplier 15 in FIG. 1. It will be seen that, in the particular circuit of FIG. 3, the coefficient multipliers are replaced by bit shifters of $2^n$ so as to simplify the construction of the circuit. More particularly, the selector 27 selects one of three outputs of $2^{-10}$, $2^{-11}$ and $2^{-12}$, respectively, from the latch circuit 26 and supplies the selected output to the selector 28 which selects one of the input terminals of $2^{-1}$, $2^{-2}$, $2^{-3}$ and $2^{-4}$, respectively, of the adder 30 for determining the input level of the adder 30. The output of the selector 28 is inverted as supplied to the adder 30, and digital data "1" from a terminal 29 is also supplied to the adder 30 simultaneously with the output of the selector 28 so that a complement of the output of the latch circuit 26 is supplied to the adder 30. Therefore, a quite small value is subtracted from the output from the latch circuit 26 by the adder 30. This subtraction operation is equivalent to the multiplying of the output of the latch circuit 26 by a number which is very slightly less then 1, for example, by the number 0.99, which corresponds to the value of the coefficient. The selector 31 is similar to the selector 27 which operates as a bit shifter. Thus, selector 31 selects one of the outputs of $2^{-10}$, $2^{-11}$ and $2^{-12}$ from the adder 30 and applies the selected output to the latch circuit 32. The selectors 27 and 31 are interlocked so as to select corresponding outputs of the latch circuit 26 and the adder 30, respectively.

The digital circuit arrangement of FIG. 3 operates as follows:

The upper six significant bits of the eight bits signal from the latch circuit 32 are supplied through the latch circuit $2^3$ to the inverted input of the comparator 11 which, at the same time, receives the six bits signal from the latch circuit 22 at the non-inverted input of the comparator 11. As earlier noted, the comparison output of the comparator 11 controls the switch circuit 12 and, when the latter is closed or ON, the adder 24 receives the six bits output from the latch 22 and, with the counter 25, corresponds to the adder 14 in the circuit 5 on FIG. 1. More particularly, the adder circuit comprised of the adder 24 and the counter 25 acts as an accumulator which, at each clock, accumulates or adds the input data from the latch 22 to the output of the multiplier formed by the selectors 27 and 28 and the adder 30 and which corresponds to the multiplier 15 in FIG. 1 for multiplying by the coefficient $\beta$.

In order to facilitate this explanation, it will be presumed that the input signal to the latch circuit 22 is comprised of two bits rather then the six bits actually used, and that the output from the counter 25 is a four bits signal rather then the twelve bits signal indicated on FIG. 3. If the input signal (1,1) is supplied from the latch 22 through the switch circuit 12 to the adder 24 at a time when the output signal from the counter 25 is 000, and assuming that $\beta$ is 1, the output of the adder 24 is (1,1) because the output of the adder 30 is (0,0,0,0,0,0) and, therefore, the output of the counter 25 remains (0,0,0,0). At the next clock, if an input having the data (1,0) is applied to the adder 24 from the latch 22, the output of the adder 24 becomes (0,1) because the previous value (1,1) is added to the new incoming value (1,0) and the resulting value is {1,0,1 (1,1+1,0=101)} and the lower 2 significant bits are provided from the adder 24 to the latch 26. A carry signal from the adder 24 is applied to the counter 25 and the output of the counter 25 becomes (0,0,0,1). At the next clock, if the new incoming signal applied to the adder 24 is (1,1), the output of the adder 24 becomes (0,0) because the previous output of (0,1) is added to the new incoming value (1,1), and the result is {(1,0,0) (1,1+0,1=100)}. The lower 2 significant bits are provided from the adder 24 to the latch 26 and a carry signal is applied to the counter 25 so that the output of the counter 25 becomes (0,0,1,0). Since the foregoing operation is repeated at every clock, the 4 bits output signal of counter 25 and the 2 bits output signal of the adder 24 are accumulated. Although, in practice, the output of the adder 24 is a 6 bits signal and the output of the counter 25 is a twelve bits signal, the operation of the circuit used in practice is quite similar to that explained above.

In respect to the multiplier 15 for multiplying the output of the adder 14 by the coefficient $\beta$ in the circuit of FIG. 1, and which is constituted by the selectors 27 and 28 and the adder circuit 30 in the practical embodiment of FIG. 3, in will be seen that in such practical circuit, the value of the coefficient $\beta$ is formed as $1\frac{1}{2}^n$. Therefore, if n is 13 or 14, the value of $1\frac{1}{2}^n$ is very close to 1. The adder circuit 30 is employed instead of a subtractor because it is very difficult to construct a subtractor. The operation of the adder circuit 30 (which actually operates as a subtractor) will now be explained with the assumption that the input signal is of four bits and n is 2. If it is further assumed that the input signal A=12 (1,1,0,0), the following equation may be considered:

$$A(1-2^n) = 12(1-\tfrac{1}{4}) = 9(1,0,0,1). \quad (1)$$

Since a two bit shift is equivalent to multiplying by $\tfrac{1}{4}$, A (1,1,0,0,1) X $\tfrac{1}{4}$=0,0,1,1=($\tfrac{1}{4}$A). The foregoing data is inverted so that (0,0,1,1) becomes (1,1,0,0) to which 1 is added, as from the terminal 29. Thus, the data becomes (1,1,0,1). Therefore, the value of the data input to the adder circuit 30 through the J and C terminals is (1,1,0,1). Since A is (1,1,0,0), the calculation is finally (1,1,0,0)+(1,1,0,0)=1:1,0,0,1=9. The foregoing result corresponds to the above equation (1).

If the affect of the selector 27 is ignored, the selection of one of the terminals of the selector 28 defines the amount of the bit shift. For example, if the lowest terminal ($2^{-4}$) is selected, the upper eight significant bits of the output from the latch circuit 26 are applied to the lower five significant bits terminals (J16, J17, J18, J19, J20) of the adder circuit 30. This means that the output of the latch circuit 26 is shifted downwardly by fifteen bits. Therefore, if the data of the output of the latch circuit 26 is assumed to be $$\underbrace{1, 0, 1, 0, 1, 0, 1, 0}_{\text{8 bits}} \underbrace{\ldots,}_{\text{12 bits}}$$

the shifted data becomes $$\underbrace{0, 0 \ldots 0}_{\text{15 bits}} \underbrace{1, 0, 1, 0, 1.}_{\text{5 bits}}$$

This corresponds to multiplying the output by $2^{-15}$. When terminal ($2^{-4}$) of the selector 28 is selected, no input signals, that is, 0 data are applied to the terminals J13, J14 and J15 of the adder circuit 30. However, since the terminals J13, J14 and J15 are inverted terminals, such 0 data are actually inverted to 1s when input to the adder circuit 30. The data "1" from the terminal 29 is applied to the terminals J1, J2, J3 ... J12, and the data "1" from a terminal 101 is applied to a carry input C to be added by adder circuit 30. Therefore, the actual data input to the adder circuit 30 from the J temrinals is $$\underbrace{1, 1 \ldots 1}_{15 \text{ bit}} \underbrace{0, 1, 0, 1, 1}_{5 \text{ bits}}.$$

The data $$\underbrace{1, 1 \ldots 1}_{15 \text{ bits}} \underbrace{0, 1, 0, 1, 1}_{5 \text{ bits}}$$

is complementary to the above noted shifted data $$\underbrace{0, 0 \ldots 0}_{15 \text{ bit}} \underbrace{1, 0, 1, 0, 1}_{5 \text{ bit}}.$$

The selector 31, which corresponds to the multiplier 13 in FIG. 1, selects eight bits of data from the eighteen bits of data ($0_1, 0_2, 0_3, \ldots 0_{18}$) output by the adder circuit 30. More specifically, when the $2^{-10}$ terminal of the selector 31 is selected, the upper 8 bits of data ($0_1, 0_2 \ldots 0_8$) are applied to the latch 32. In a similar manner, when the $2^{-11}$ terminal is selected on selector 31, eight bits of data starting from the second most significant bit, that is, the data bits ($0_2, 0_3, 0_4, \ldots 0_7$) are applied to the latch 32. The upper six bits of the data comprising the output of the latch 32 are applied through the latch 23 to the comparator 11. On the other hand, the lower six significant bits of data ($0_{13}, 0_{14} \ldots 0_{18}$) from the adder circuit 30 are applied to the adder 24 and such data are added thereby to the input six bits of data from the latch 22. Therefore, the input six bits of data correspond, in significance, to the lowest six significant data bits ($0_{13}, 0_{14}, \ldots 0_{18}$) of the output eighteen bits of data ($0_1, 0_2, 0_3, \ldots 0_{18}$) from the adder circuit 30. The foregoing means that the input six bits of data are added after having been shifted downwardly by twelve bits, that is, the input data are multiplied by $2^{-12}$. Accordingly, the selector 27 is provided to synchronize the selecting operation of the selector 31.

It will be appreciated from the above that the control terminals 16' for receiving a control signal for the selectors 27 and 31 in FIG. 3 correspond to the terminal 16 for controlling the value of the coefficient α in FIG. 1, and that the control terminal 17' for receiving a control signal for the selector 28 in FIG. 3 corresponds to the terminal 17 in FIG. 1 for receiving a control signal that determines the value of the coefficient β.

Although a specific hard-wired circuit arrangement has been described with reference to FIG. 3 for the reference voltage generating circuit 5 in FIG. 1, it will be understood that a digital signal processor (DPS) with a suitable software program can be employed in place thereof.

It will be appreciated that, if the picture correlation between odd and even fields of the color video signal is poor, a reference voltage generated by the circuit 5 on the basis of a previous field would not be adequate for controlling the white balance for a succeeding field by means of the circuit shown on FIG. 1. In order to solve that problem, a white balance control or correction circuit in accordance with an embodiment of this invention is shown on FIG. 4 to include, in addition to the elements described with reference to FIG. 1 and identified by the same reference numerals, a one-field delay circuit 18 and a mean value generating circuit 19 which are provided in place of the field mean value generating circuit 6. More specifically, the generated reference voltage $E_{th}$ from circuit 5 is supplied through the one-field delay circuit 18 to one input of the mean value generating circuit 19 and also directly from the circuit 5 to another input of the circuit 19 which has its output connected to the inverted input of the comparator 4. In operation, the mean value generating circuit 19 generates a mean value of the reference voltages supplied thereto directly from the reference voltage generating circuit 5 and through the one-field delay circuit 18, respectively. Thus, if the one-field delayed reference voltage is designated $E_{th}(2n)$ and the reference voltage directly obtained from the reference voltage generating circuit 5 is designated $E_{th}(2n+1)$, the mean value voltage $EE_{th}(n)$ can be derived from the following equation:

$$EE_{th}(n) = \frac{E_{th}(2n) + E_{th}(2n+1)}{2} \quad (2)$$

Such mean value voltage $EE_{th}(n)$ specified by equation (2) above is supplied to the comparator 4 which then functions to detect the voltage level of the added output of the adder 3 substantially in the same manner as has been described above with reference to the embodiment of FIG. 1.

The mean value generating circuit 19 may be constituted by an adder having its two inputs connected to the output of the one-field delay circuit 18 and to the output of the reference voltage generating circuit 5, respectively, and a one-half multiplier, for example, constituted by a resistor, connected between the output of the adder and the inverted input of the comparator 4. Such resistor is dimensioned to provide to the inverted input of the comparator 4 a voltage that is one-half the value of the output voltage of the adder.

Figure 4:
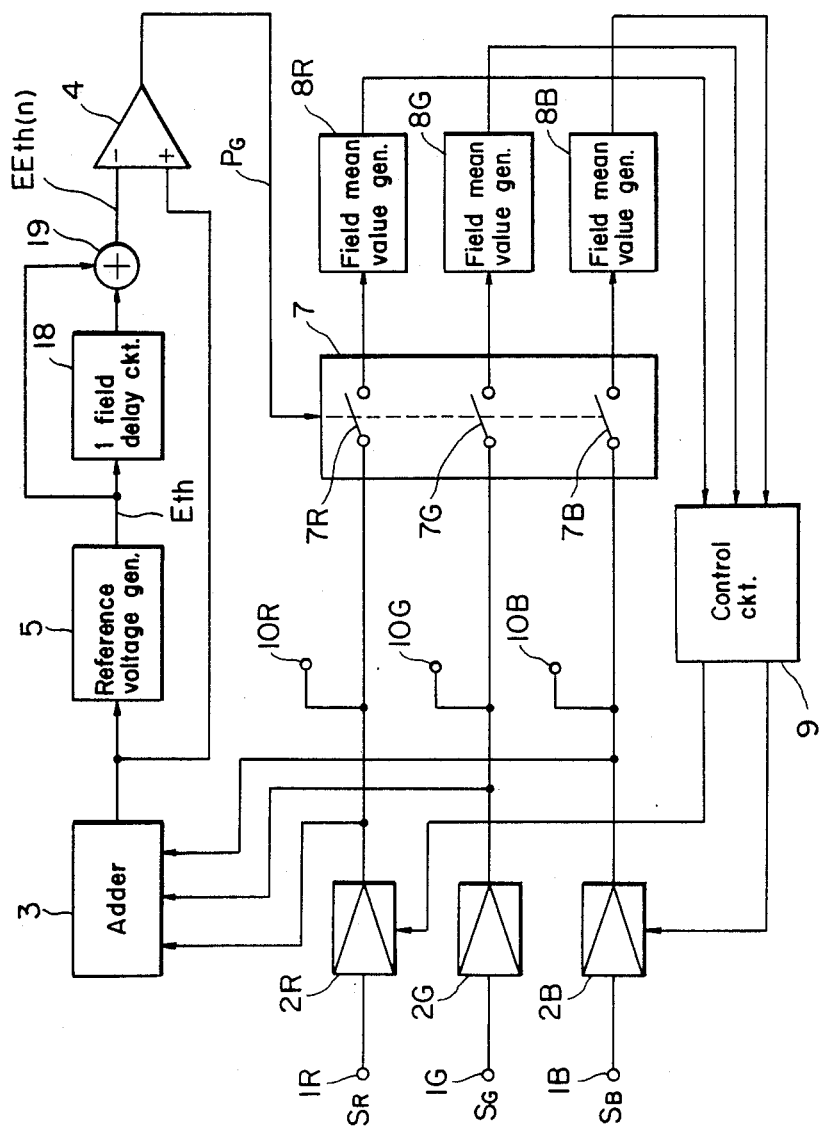
FIG. 4 is a circuit diagram similar to that of FIG. 1, but showing an automatic white balance control circuit according to another embodiment of this invention.
Figure 5:
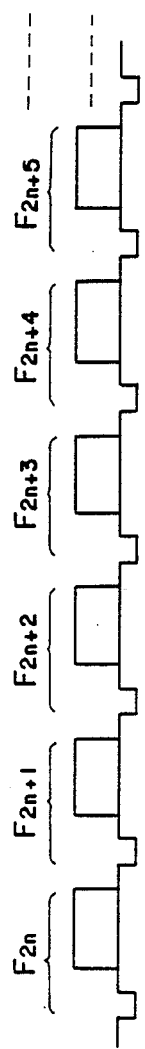
FIG. 5 is a waveform to which reference will be made in explaining the operation of the embodiment of FIG. 4.

The operation of the white balance correction circuit shown on FIG. 4 will now be described in detail with reference to FIG. 5 which identifies successive fields of a color video signal as $F_{2n}, F_{2n+1}, F_{2n+2}$—etc., in which the field $F_{2n}$ is an even numbered field. It will be understood that the reference voltage $E_{th}(2n)$ generated by the reference voltage generating circuit 5 on the basis of the equally mixed or added red, green and blue color signals for the field $F_{2n}$ is added to a reference voltage $E_{th}(2n+1)$ based on the added output of the adder 3 for the next succeeding odd field $F_{2n+1}$ in the mean value generating circuit 19 which thereby provides the mean value reference voltage $EE_{th}(n)$ in accordance with equation (2) above. That mean value reference voltage is employed as a threshold level for generating the gating pulse $P_G$ used in detecting voltage levels of the red, green and blue color signals of further succeeding fields $F_{2n+2}$ and $F_{2n+3}$ in the same manner as has been described with reference to FIG. 2. With this arrangement shown in FIG. 4, even if there is poor correlation between the pictures represented by the odd and even fields, appropriate detection of the white portion of the object in the field of view of the camera is achieved by the gating pulse $P_G$ because the threshold level for the level detection used in generating the gating pulse is determined with reference to the mean reference voltage value $EE_{th}(n)$. Therefore, the precision of the white balance correction is improved.

It will be appreciated that other means are available, for example, the root mean square (RMS) technique, for obtaining the mean value of the reference voltage from the circuit 5. Moreover, the reference voltages for particular odd and even fields, respectively, can be used for succeeding odd and even fields, respectively.

Figure 6:
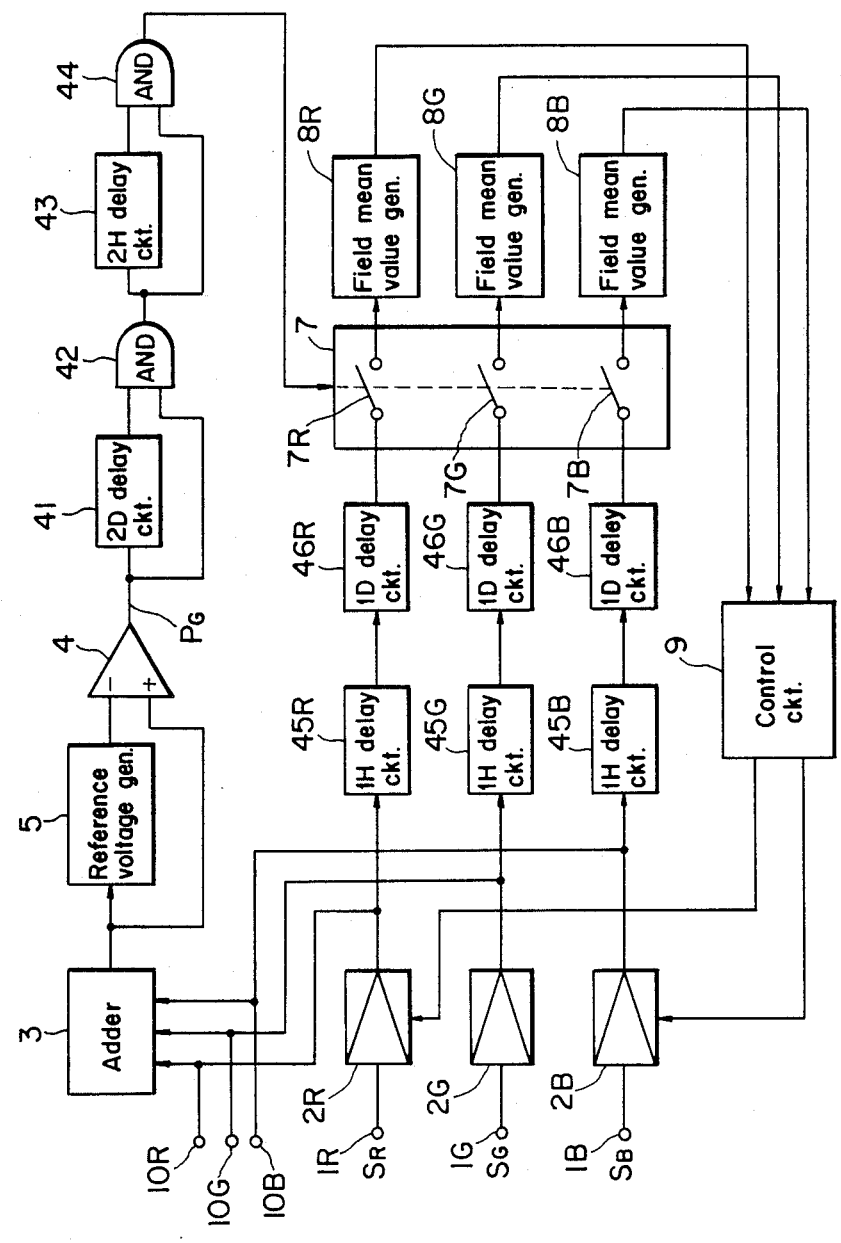
FIG. 6 is a circuit diagram of an automatic white balance control circuit according to still another embodiment of the present invention.

Referring now to FIG. 6, it will be seen that, in a white balance correction circuit according to another embodiment of this invention, the elements corresponding to those described with reference to FIG. 1 are again identified by the same reference numerals and, in addition thereto, there are provided a 2D delay circuit 41 receiving the gating pulse $P_G$ from the comparator 4, an AND gate 42 which, at its inputs, receives the output of the delay circuit 41 and the gating pulse $P_G$ directly from the comparator 4, a 2H delay circuit 43 receiving the output of the AND gate 42, and which may be constituted by a one bit line memory, and an AND gate 44 which, at its inputs, receives the delayed output from delay circuit 43 and the direct output from the AND gate 42. Further, 1H delay circuits 45R, 45G and 45B and 1D delay circuits 46R, 46G and 46B are connected in series between the amplifier 2R and the switch 7R, between the amplifier 2G and the switch 7G, and between the amplifier 2B and the switch 7B, respectively.

With the exception of the above noted added elements, the white balance correction circuit of FIG. 6 operates substantially in the same manner as that described with reference to FIG. 1, so that the operation of the circuit shown on FIG. 6 will be described in detail only in respect to the aspects thereof affected by the added elements. In respect to the 2D delay circuit 41 and the 1D delay circuits 46R, 46G and 46B, it is to be noted that D refers to a delay time which is determined, as herinafter described in detail, with reference to the width of end edge portions of the peak region of the output signal from the adder 3.

Figure 7:
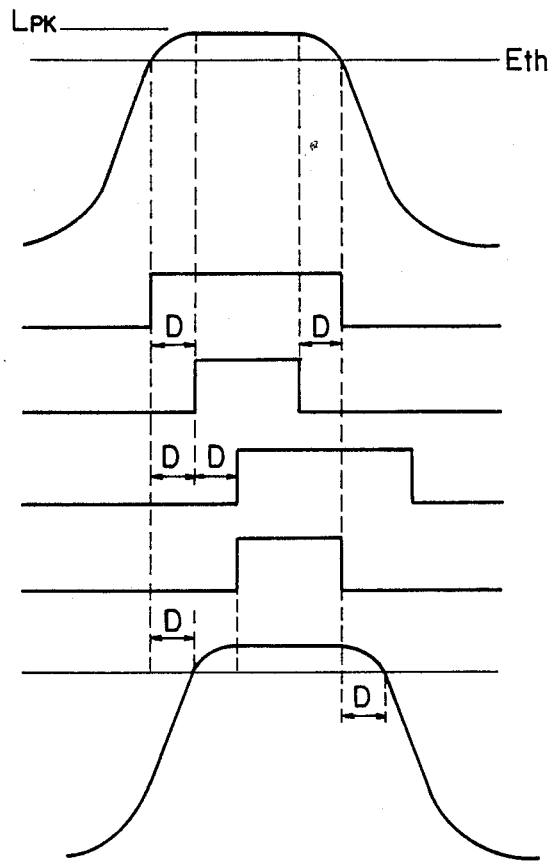
FIGS. 7A-7F are waveforms to which reference will be made in explaining the operation of the circuit shown on FIG. 6.

In the operation of the circuit shown on FIG. 6, the pulse (FIG. 7B) obtained from the comparator 4 by comparing the added output of adder 3 with the reference voltage $E_{th}$ (FIG. 7A) from the generating circuit 5 is applied directly to the AND gate 42 which also receives the same pulse delayed 2D (FIG. 7D) through the delay circuit 41. Thus, the AND gate 42 provides a logical AND signal (FIG. 7E) which constitutes a gating pulse having a width shorter by 2D then the gating pulse $P_G$ that would otherwise be obtained at the output of the comparator 4. The output (FIG. 7E) from the AND gate 42 is supplied through the 2H delay circuit 43 (H being the horizontal scanning period of the video signal) and directly to respective inputs of the AND gate 44 which similarly generates a logical AND signal of the 2H delayed signal and the direct signal from the AND gate 42. The output of the AND gate 44 is supplied to the gate switching circuit 7 as the white balance correction gating pulse. The shortening of such gating pulse by the action of the 2D delay circuit 41 and the AND gate 42 is for the purpose of avoiding detection of gray horizontally extending marginal regions of the white portion of the object in the field of view of the camera, and the further shortening of the gating pulse effected by the 2H delay circuit 43 and the AND gate 44 is for the purpose of avoiding detection of gray vertically extending marginal regions of such white portion. The delaying of the red, green and blue color signals from the amplifiers 2R, 2G and 2B in the delay circuits 46R, 46G and 46B, respectively, by a delay time of 1D, and in the delay circuits 45R, 45G and 45B, respectively, by the delay time 1H provides synchronizing of the color signals arriving at the switching circuit 7 with the shortened gating pulse for controlling the latter. In this connection, it will be apparent from a comparison of FIGS. 7E and 7F that each of the delay circuits 46R, 46G and 46B is effective to restore the desired timing relation between the gating pulse from the AND gate 44 and each of the color signals from the amplifiers 2R, 2G and 2B. Similarly, the delay circuits 45R, 45G and 45B, restore the desired timing relation between the gating pulse, as modified by the delay circuit 43 and the AND gate 44, and the color signals from the amplifiers 2R, 2G and 2B.

By shortening the gating pulse to avoid detection of gray marginal regions extending in horizontal and vertical directions, the embodiment of FIG. 6 further ensures that the gated portions of the red, green and blue color signals applied to the control circuit 9 for effecting white balance correction will not correspond to merely a highlight occupying a small area of the object in the field of the view of the camera. Of course, by obtaining a gating pulse of shortened or reduced width, it is made certain that grey marginal regions of a white portion of the object in the field of view will not contribute to the color signals employed for effecting the white balance correction. In other words, only those portions of the color signals applied to the gate switching circuit 7 which correspond to a truly white portion of the object in the field of view are detected or passed through circuit 7 for effecting the white balance correction.

Although the embodiment of FIG. 6 is described as being applied to a processing circuit for a digital color video signal, it will be appreciated that the features of that embodiment described above are similarly applicable to an analog color video signal processing circuit.

The optical system of a color video camera is usually provided with an adjustable iris or diaphragm having movable blades by which the size of the light-admitting opening is varied, or with an optical diaphragm having an optical-electrical transducer with an electrically controlled transmission factor for similarly varying the amount of admitted light. The iris or diaphragm may be controlled manually or automatically in accordance with the brightness of an object in the field of view or in accordance with the amount of light incident on a sensing element. In order to effect automatic iris or diaphragm control, it has been known to employ a circuit of the type shown on FIG. 8 and in which primary color signals R, G and B from an image pick-up device of a color video camera are supplied to respective input terminals 1R, 1G and 1B. Such primary color signals are supplied from the respective input terminals to a non-adder mixer 50, hereinafter referred to as an NAM, and in which the primary color signal having the highest level or amplitude is selected and supplied to a peak detecting circuit 51 and to a mean value detecting circuit 52. Outputs of the peak detecting circuit 51 and the mean value detecting circuit 52 are mixed in a desired ratio adjustably determined by a variable resistor 53, and the result of such mixing is provided at an output terminal 54 and may be used for controlling an iris or diaphragm drive circuit.

Figure 9:
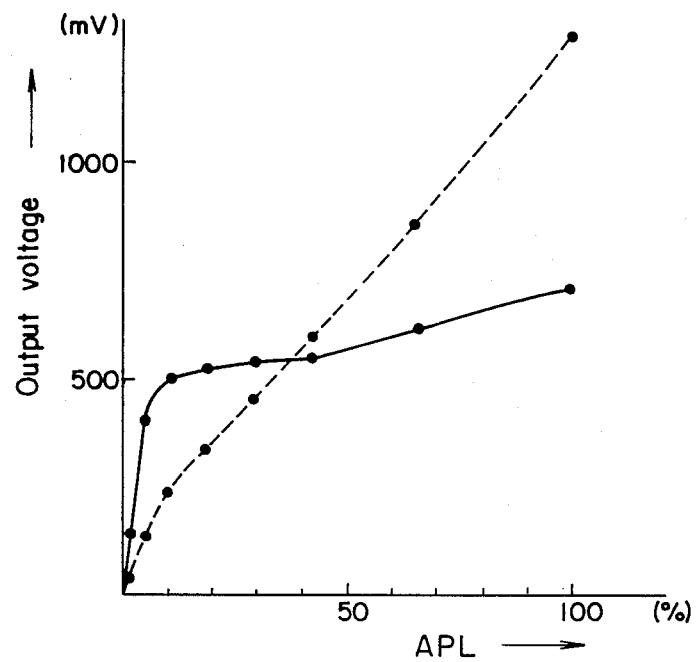
FIG. 9 is a graph illustrating typical input-output characteristics of the peak detector circuit and the mean value detector circuit employed in the automatic iris control circuit of FIG. 8.

The peak detecting circuit 51 may, for example, have an input-output characteristic as represented by the solid line on FIG. 9, while the mean value detecting circuit 52 has an input-output characteristic which is represented, for example, by the broken line on FIG. 9. In the graph of FIG. 9, the abscissa indicates the percentage ratio of the area of white peak portion (100

IRE) to the area of pedestal level portion (0 IRE) corresponding to the background of the image in the field of view of the camera. Such percentage ratio is referred to as the average picture level (APL). Further, in FIG. 9, the ordinate shows the outputs of the circuits 51 and 52 in millivolts (mV). It will be seen that the lines representing the characteristics of the peak detecting circuit 51 and the mean value detecting circuit 52 intercept at a position corresponding to approximately 38% APL. An input-output characteristic corresponding to a curve (not shown) which is located between the curves in solid and broken-lines on FIG. 9 may be obtained by changing the mixing ratio determined by the variable resistor 53. Since the control operation of the automatically controlled iris or diaphragm changes with changes in the input-output characteristics, various modes of the automatic iris control operation can be selected by changing the mixing ratio of the outputs from the peak and mean value detecting circuits 51 and 52, that is, by adjusting the variable resistor 53, in accordance with the conditions of operation of the camera or the nature of the object in the field of view of the camera. However, in the known circuit shown on FIG. 8, the peak detecting circuit 51 includes a diode $D_1$, a capacitor $C_1$ and a resistor $R_1$, and the input-output characteristic of the circuit 51 is determined by the characteristics of the diode $D_1$ and the capacitor $C_1$. Therefore, even if the variable resistor 53 is used for changing the ratio with which the outputs of the circuits 51 and 52 are mixed, the range over which the overall characteristic of the known circuit of FIG. 8 may be varied is narrowly limited. Correspondingly, the mode selection of the automatic iris control has a narrow range so that the associated video camera is not adapted for use with a wide variety of shooting conditions.

Figure 10:
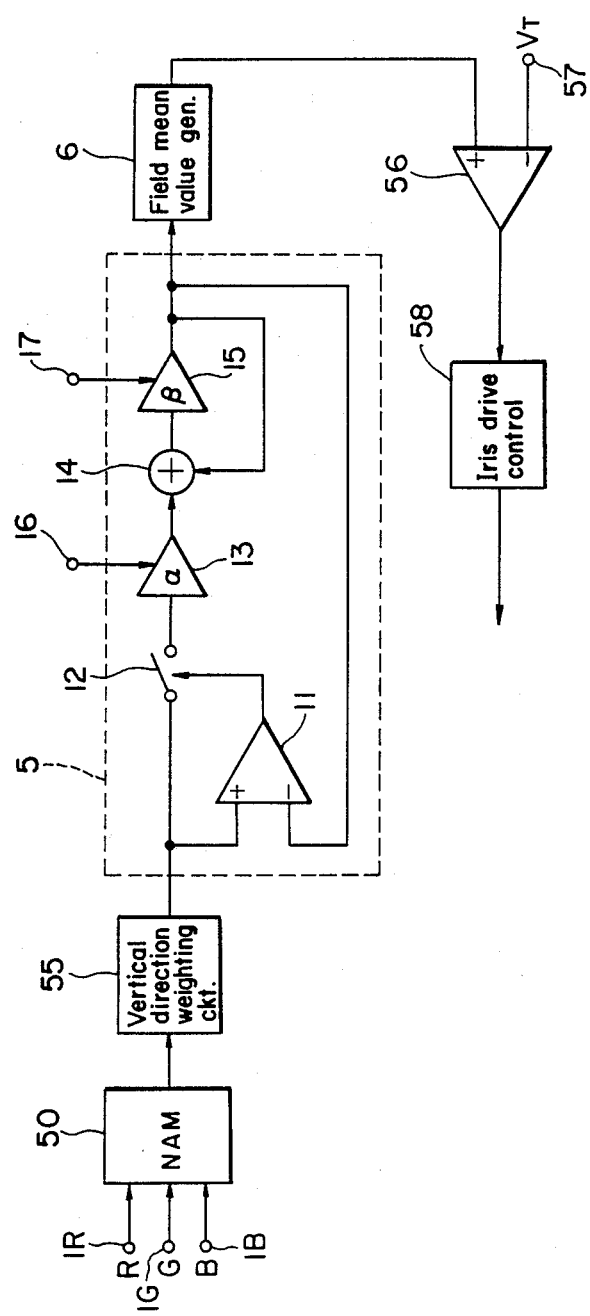
FIG. 10 is a circuit diagram of an automatic iris control circuit according to an embodiment of the present invention.
Figure 11A:
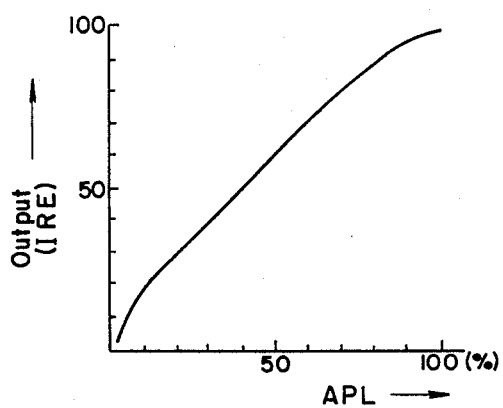
FIGS. 11A-11D, FIGS. 12A-12D and FIGS. 13A-13D show various input-output characteristics of a peak detecting circuit included in the automatic iris control circuit of FIG. 10.
Figure 11B:
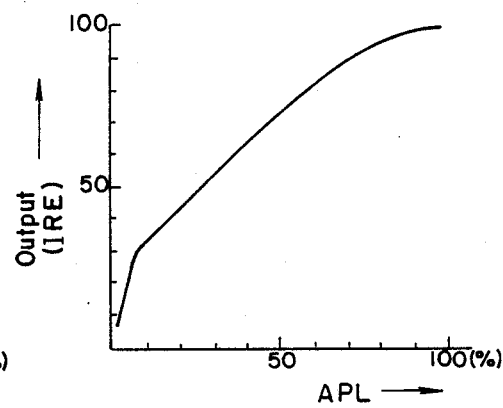
Figure 11C:
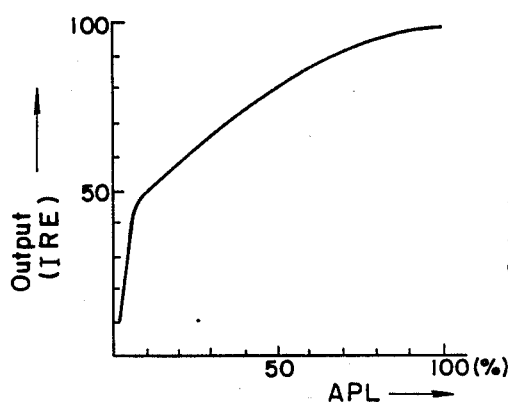
Figure 11D:
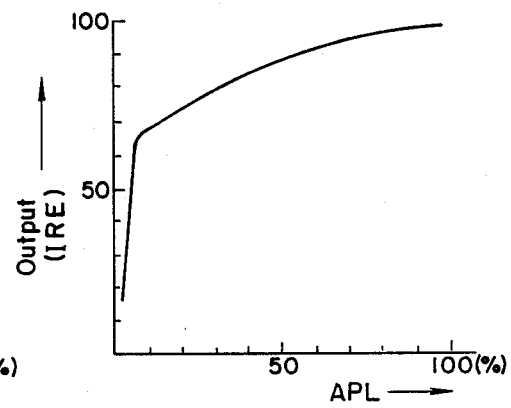
Figure 12A:
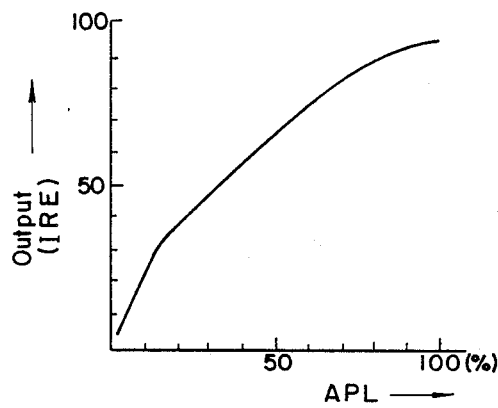
Figure 12B:
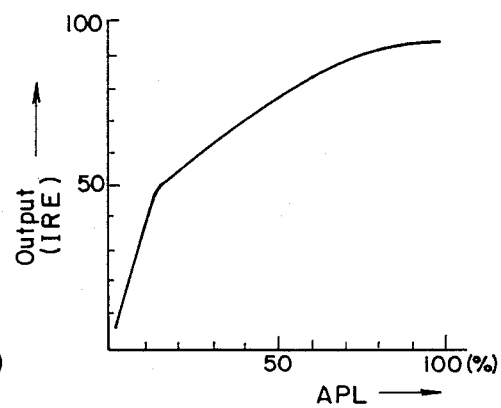
Figure 12C:
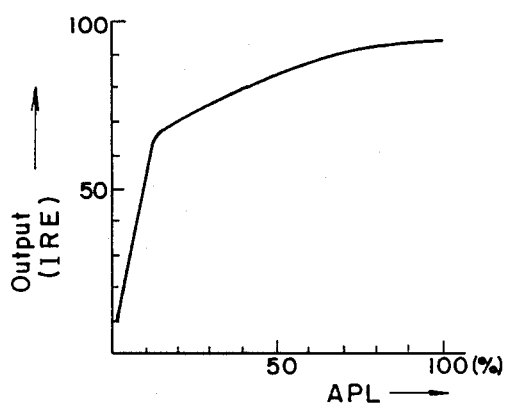
Figure 12D:
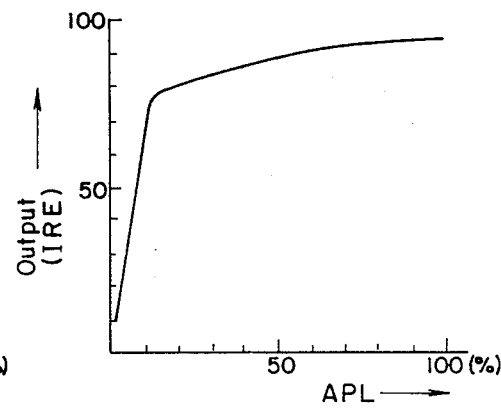
Figure 13A:
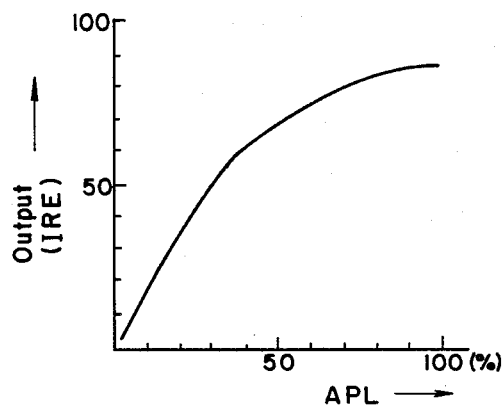
Figure 13B:
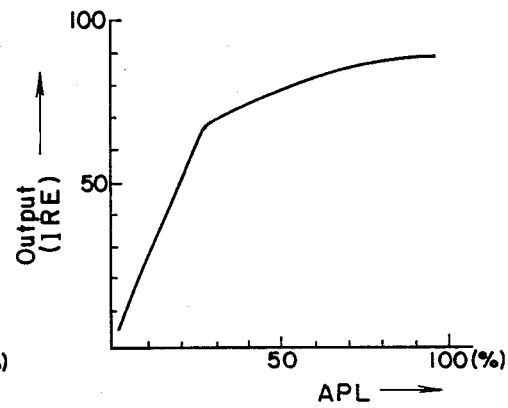
Figure 13C:
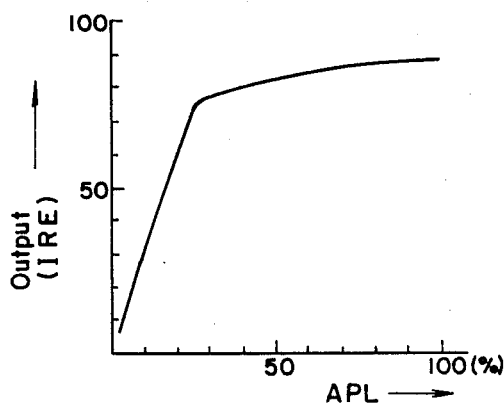
Figure 13D:
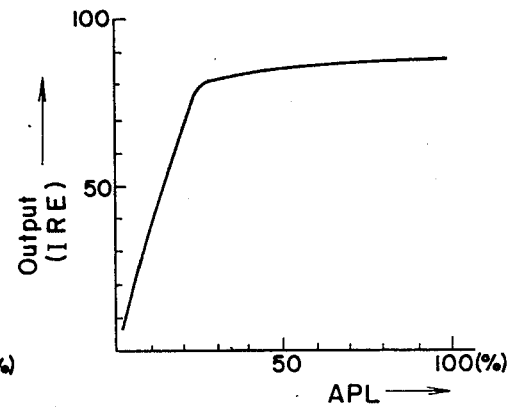

Referring now to FIG. 10, it will be seen that, in an automatic iris control circuit according to an embodiment of the present invention and which avoids the above noted disadvantages of the prior art, digital primary color signals R, G and B, for example, from a digital color video camera, are again supplied through respective input terminals 1R, 1G and 1B to a NAM circuit 50 in which the one of the three digital color signals having the highest level or amplitude is selected or extracted and supplied to a weighting circuit 55 which weights the signal on the basis of its vertical position in the video picture. The reason for the weighting circuit 55 will be understood by considering that a bright sky may often occupy an upper portion of the video picture. Thus, the signal from the NAM 50 which corresponds to the upper portion of the video picture is neglected or weighted relatively lower by the weighting circuit 55. The output from the weighting circuit 55 is supplied as the input to a detecting circuit 5 which is similar to the detecting circuit 5 described above with reference to FIG. 1, but which, in this instance, functions as a peak detecting circuit. The output of the peak detecting circuit 5 in FIG. 10 is supplied to a field mean value generating circuit 6 which provides a mean value of the detected peak signal for the period of a field of the video signal. The mean value obtained as an output from the field mean value generating circuit 6 is supplied to one input terminal, for example, a non-inverted input terminal of a comparator 56 which, at its other or inverted terminal, receives reference voltage data $V_T$ corresponding to a predetermined desired value of the iris control, and which is applied to a terminal 57. Error data generated by the comparator 56 in response to differences between the reference voltage data $V_T$ representing a desired value of iris control, and the mean value from the field mean value generating circuit 6 are supplied to an iris driving control circuit 58 by which the adjustable iris or diaphragm is driven. Thus, the iris diaphragm is automatically controlled so that the mean value of the signal detected by the peak detecting circuit 5 remains substantially constant at a predetermined value.

Figure 8:
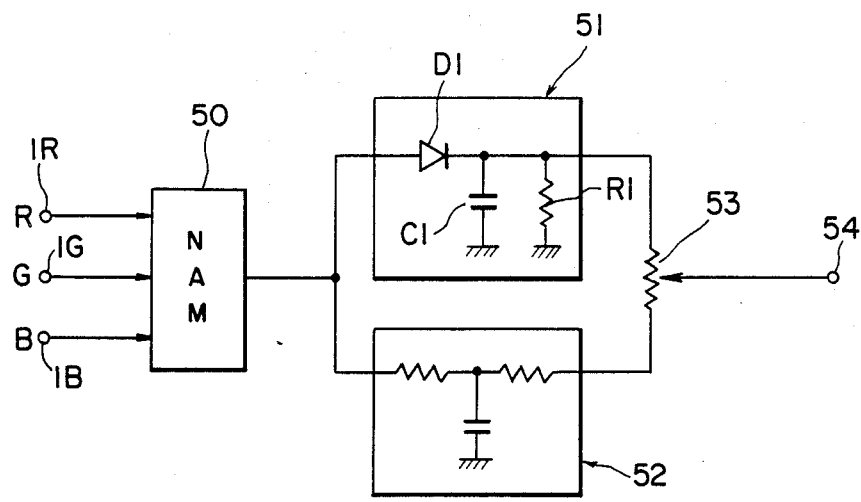
FIG. 8 is a circuit diagram of a known automatic iris control circuit for a color video camera, and which includes a peak detector circuit and a mean value detector circuit according to the prior art.

It will be seen that, in the automatic iris control circuit embodying this invention, as shown on FIG. 10, the detecting circuit 5 essentially replaces the conventional detectors 51 and 52 in FIG. 8. The detecting circuit 5 is charged and discharged by the output obtained from the NAM circuit 50 through the vertical weighting circuit 55 for providing the level detected output. Further, the detecting characteristics of the detecting circuit 5 can be changed in response to an automatic iris mode selecting operation. In order to appreciate how the circuit 5, which operates as a reference voltage generating circuit in the embodiments of FIGS. 1 and 3, can operate as a peak detecting circuit in the embodiment of FIG. 10, a further brief explanation may be desirable. As earlier noted, in the automatic iris control circuit according to the prior art shown on FIG. 8, the peak detecting circuit 51 includes a diode $D_1$, capacitor $C_1$ and resistor $R_1$. When an input signal is supplied to the input terminal of the diode $D_1$ from the NAM circuit 50, such input signal is passed through the diode $D_1$ with a slight dc voltage shift which may be neglected. A peak voltage at the output of the diode $D_1$ is charged into the capacitor $C_1$, and then the charged voltage begins to discharge through the resistor $R_1$, with the discharging speed or time depending upon the capacitance and resistance of the capacitor $C_1$ and the resistor $R_1$, respectively. Similarly, the circuit 5 includes a charging device constituted by the switch 12, the multiplier 13 and the adder 14, and also a discharging device constituted by the adder 14 and the multiplier 15. Thus, it will be appreciated that the circuit 5 in FIG. 10 operates as a peak detector in which the charging time constant and the discharging time constant are controllable by the control signal applied to the terminals 16 and 17 for determining the coefficients $\alpha$ and $\beta$ and eventually changing the peak detecting characteristic.

Assuming that the specific circuit arrangement of FIG. 3 is employed as the detector circuit 5 in the automatic iris control circuit of FIG. 10, FIGS. 11A–11D, FIGS. 12A–12D and FIGS. 13A–13D show variations of the detecting characteristics of that circuit 5 in response to changes in the coefficients $\gamma$ ($\beta = 1 - \gamma$) and $\alpha$ which are respectively determined by the switching operation of the selectors 27 and 28 and the switching operation of the selectors 27 and 31. In each of FIGS. 11A–11D, 12A–12D and 13A–13D, the APL or average picture level is plotted as the abscissa, and the output level (IRE value) is plotted as the ordinate. More specifically, FIGS. 11A–11D show characteristics of the detecting circuit 5 for the case where the $2^{-10}$ terminals of selectors 27 and 31 are selected so that the coefficient $\alpha$ is $2^{-10}$. Similarly, FIGS. 12A–12D and FIGS. 13A–13D respectively show the characteristics for the cases where the $2^{-11}$ and $2^{-12}$ terminals of the selectors 27 and 31 are engaged. Further, FIGS. 11A, 12A and 13A, FIGS. 11B, 12B and 13B, FIGS. 11C, 12C and 13C, and FIGS. 11D, 12D and 13D correspond to the selection of the terminals $2^{-1}$, $2^{-2}$, $2^{-3}$ and $2^{-4}$, respectively, of the selector 28. Since $\beta=1-\gamma$, the values of the coefficient $\gamma$ for FIGS. 11A, 11B, and 11C and 11D are $2^{-11}$, $2^{-12}$, $2^{-13}$ and $2^{-14}$, respectively. Similarly, the values of the coefficient $\gamma$ for FIGS. 12A, 12B, 12C and 12D are $2^{-12}$, $2^{-13}$, $2^{-14}$ and $2^{-15}$, respectively, and the values of the coefficient $\gamma$ for FIGS. 13A, 13B, 13C and 13D are $2^{-13}$, $2^{-14}$, $2^{-15}$ and $2^{-16}$, respectively. As will be clearly apparent from FIGS. 11A-11D, 12A-12D and 13A-13D, large numbers of detecting characteristics can be realized by changing the values of the coefficients $\alpha$ and $\beta$ which are determined by the selecting operation of the selectors 27, 28 and 31.

Before proceeding with a discussion of further improved embodiments of automatic iris control circuits according to this invention, it is pointed out that, in the case of the known peak detector circuit 51 of FIG. 8, the peak detecting characteristic may fluctuate due to the temperature characteristics of the diode $D_1$ and the capacitor $C_1$ included in the circuit 51. By reason of the foregoing, the intersection of the characteristic curves of the peak detector circuit 51 and the mean value detector circuit 52 will vary with changes in temperature. Therefore, if a different operating mode is selected after the temperature has changed, the APL value corresponding to the intersection of the characteristic curves for the detector circuit 51 and 52, respectively, will fluctuate.

Moreover, in the case of the automatic iris control circuit of FIG. 10 incorporating the digital signal processing arrangement of FIG. 3 in its peak detecting circuit 5, a desired automatic iris control mode can be selected by establishing the corresponding characteristic curve through suitable operation of the selectors 27, 28 and 31. However, since the APL value corresponding to a predetermined output value is not constant for the several different peak detecting characteristics, the APL value corresponding to the predetermined output value may change in response to changing of the selected mode. Such change of the APL value causes a fluctuation in the error data generated by the comparator 56 in response to the predetermined output value, and also a change in the value of the output obtained from the detector circuit 5 for an input signal having the same APL value. By reason of the foregoing, automatic iris control may not be fully satisfactory and the brightness of the picture displayed on a monitor may change undesirably.

Figure 14:
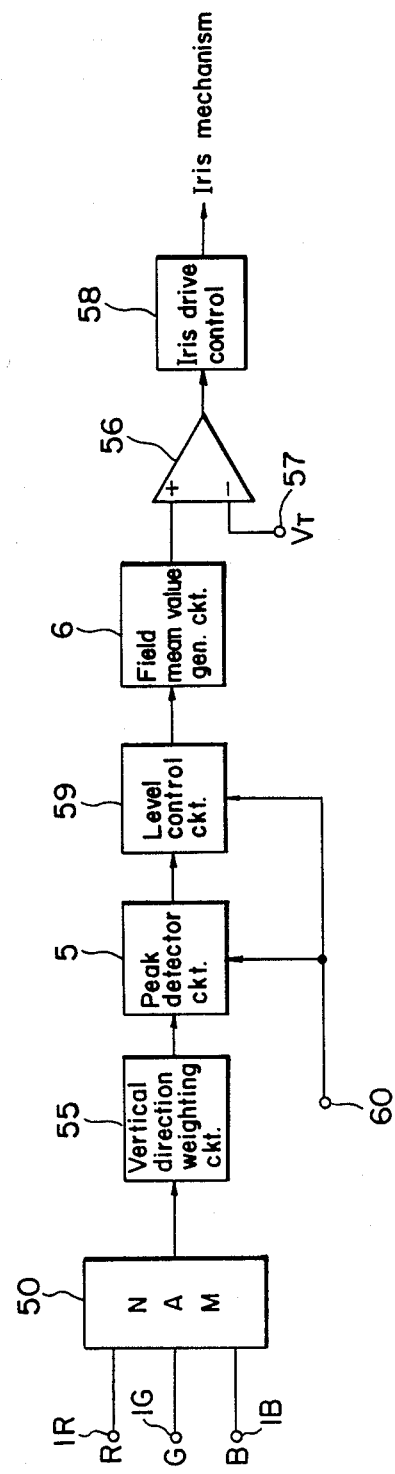
FIG. 14 is a circuit diagram showing an automatic iris control circuit according to another embodiment of the present invention.

Referring now to FIG. 14, it will be seen that, in an automatic iris control circuit according to another embodiment of this invention, and in which components corresponding to those described above with reference to FIG. 10 are identified by the same reference numerals, the above noted problem associated with the circuit of FIG. 10 is avoided by interposing a level control circuit 59 between the peak detector circuit 5 and the field mean value generating circuit 6. Further, a terminal 60 is provided to receive a mode selection signal which is applied to the level control circuit 59 for selectively determining the control level of the latter, and to the peak detector circuit 5 for establishing the coefficients $\alpha$ and $\beta$, and thereby establishing the peak detector mode and the respective detector characteristic thereof. The mode selection signal applied to the terminal 60 may be provided by a controller or central processing unit (CPU) included in the color video camera.

Since the automatic iris control circuit of FIG. 14 differs, in its operation, from the previously described operation of the circuit of FIG. 10 only in respect to the influence of the level control circuit 59, only the operational effect of the circuit 59 will be described in detail with reference to FIGS. 15-18.

Figure 15:
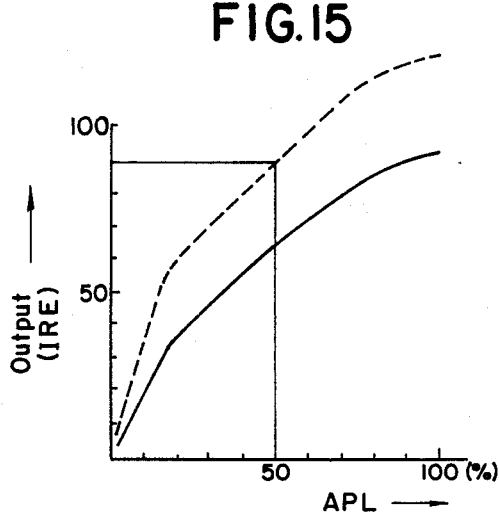
FIGS. 15, 16, 17 and 18 show input-output characteristics of a detecting or charge-discharge control circuit employed in accordance with this invention when supplied with various control coefficients.
Figure 16:
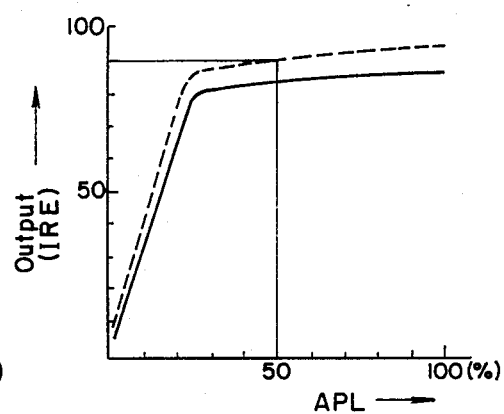

Initially, it is to be noted that FIGS. 15 and 16 show detecting characteristics for the case where a variable gain amplifier is employed as the level control circuit 59. In each of FIGS. 15 and 16, the solid line shows the detecting characteristic when level control by the circuit 59 is not provided, whereas the broken line illustrates the level controlled detecting characteristic. Further, FIG. 15 shows the detecting characteristics for the case where the coefficient $\alpha$ is selected to be to $2^{-11}$ by the operation of the selectors 27 and 31, while the coefficient $\gamma$ is selected to be $2^{-12}$ by the operation of the selectors 27 and 28, from which it follows that the coefficient $\beta=(1-2^{-12})$. Similarly, FIG. 16 shows the detecting characteristic when the coefficient $\alpha$ is $2^{-12}$ and the coefficient $\gamma$ is $2^{-16}$ ($\beta=1-2^{-16}$). In each of FIGS. 15 and 16, the desired value of the output (IRE) is said to be 90. Therefore, the gain of the level control circuit 59 is controlled so that the output value is 90 IRE when the APL value is 50%. In other words, when the mode shown in FIG. 15 is selected, the gain of the level control circuit 59 is selectively controlled to be 90/65 so as to amplify the output of the peak detector circuit 5 from the value 65 IRE to 90 IRE when the APL value is 50%. On the other hand, when the mode illustrated in FIG. 16 is selected, the gain of the level control circuit 59 is selectively controlled to be 90/84 in order to amplify the output of the peak detector circuit 5 from the value 84 IRE to 90 IRE when the APL value is 50%. In other words, for the modes illustrated by FIGS. 15 and 16, respectively, the variable gain amplifier constituting the level control circuit 59 is selectively controlled to provide the detecting characteristics shown by the broken lines instead of the detecting characteristics represented by the solid lines. Thus, in order to keep the APL value constant at 50% for the predetermined output value of 90 IRE, the control level or degree of amplification, in the case of FIGS. 15 and 16, established by the level control circuit 59 is varied or selected in accordance with the respective mode.

Figure 17:
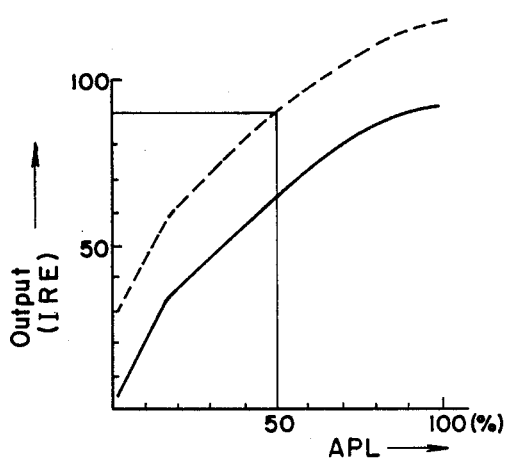
Figure 18:
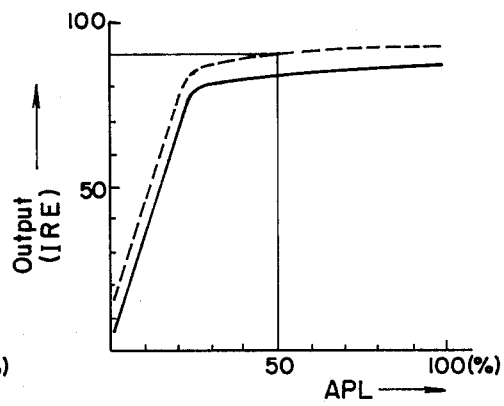

Instead of controlling the degree of amplification provided by a variable gain amplifier in the level control circuit 59, as in FIGS. 15 and 16, it is possible, in accordance with this invention, to control a dc voltage level for achieving the stated purpose, that is, for obtaining an output of 90 IRE when the APL value is 50% for different detecting modes. An example of such dc voltage shift is shown in FIGS. 17 and 18, with FIG. 17 illustrating the mode when the coefficients $\alpha$ and $\beta$ are selected to be $2^{-11}$ and $1-2^{-12}$, respectively, while FIG. 18 illustrates the mode in which $\alpha$ and $\beta$ are selected to be $2^{-12}$ and $1-2^{-16}$, respectively. It will be appreciated that, when the mode shown in FIG. 17 is selected, the level control circuit 59 of FIG. 14, shifts the dc level by 25 IRE (90−65=25), whereas, when the mode illustrated in FIG. 18 is selected, the circuit 59 shifts the dc level by 6 IRE (90−84=6). Thus, in both cases, the APL value corresponding to the predetermined output of 90 IRE is maintained constant at 50%.

It will be appreciated that, for modes other than those illustrated by FIGS. 15 and 17 and FIGS. 16 and 18, respectively, and which are established by suitable arrangements of the selectors, 27, 28 and 31, either the degree of amplification or the dc voltage level is appropriately controlled by the level control circuit 59 so as to maintain the APL value constant at 50% for the predetermined output of 90 IRE. The level control circuit 59 may take other forms than the described variable gain amplifier or dc voltage level adjuster. For example, a read only memory (ROM) may be provided with various control levels previously memorized therein and being automatically addressed by a CPU for providing the desired control level.

In any case, in accordance with this invention, since the APL value is kept constant for a predetermined output value, changing of the selected mode does not adversely affect the automatic iris control operation. Further, since the automatic iris control circuit can be digitized, it is possible to employ IC technology for reducing the size and power consumption of such circuit, and making the same readily applicable to digital type color video cameras.

In the automatic iris control circuits according to this invention which have been described above with reference to FIGS. 10 and 14, the circuit 6 has been provided to generate a mean value of the exposure or incident light data during the period of one or more fields of the video signal when digitally controlling the automatic iris mechanism. However, a vast number of calculations and high-speed computing circuits would be required to generate a mean value of all of the data defining the entire video picture during one or more fields thereof. In order to desirably reduce the numbers of calculations that are required for obtaining the mean value, the use of a so-called thinned out sampling method may be considered. Such thinned-out sampling method comprises cutting off a high frequency component of the video signal by means of a digital low pass filter, sampling the resulting low pass filtered video signal at equally spaced locations in the data stream so as to provide thinned-out sampling data, adding the thinned-out sampling data corresponding to one or more video fields, and averaging the added data for generating the desired mean value. However, the described thinned-out sampling method is disadvantageous in that it requires the use of a circuit of relatively large size and complexity due to the inclusion therein of the digital low pass filter. Further, if the thinned-out sampling of the video signal is effected in accordance with a predetermined pattern, and there is a strong correlation between the thinned-out data and the content of the video picture, the thinned-out sampling of the video signal has the further disadvantage of generating an inadequately precise mean value.

Figure 19:
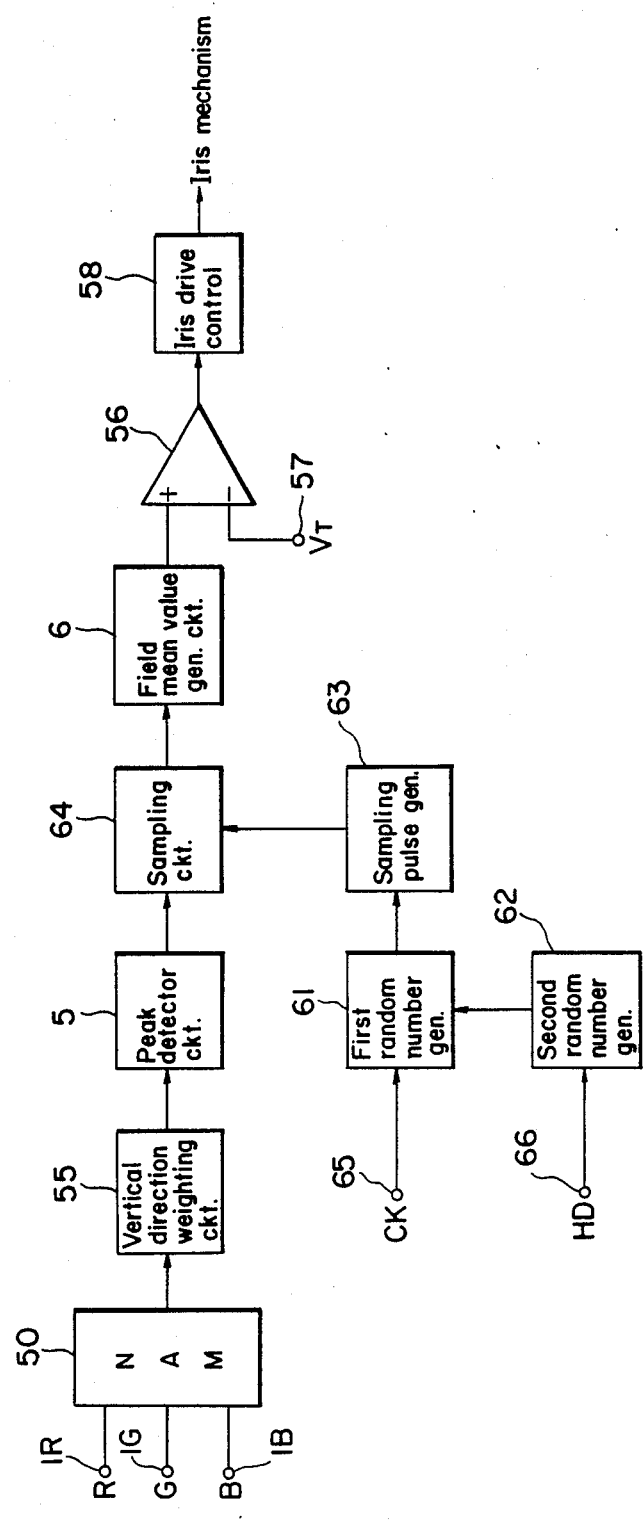
FIG. 19 is a circuit diagram of an automatic iris control circuit according to still another embodiment of this invention.

In order to overcome the above noted disadvantages of the earlier considered thinned-out sampling methods, an automatic iris control circuit in accordance with still another embodiment of this invention is shown, in FIG. 19, to employ first and second random number generators 61 and 62 which, in association with a sampling pulse generator 63, provide a sampling pulse to a sampling circuit 64 which is interposed between the peak detector circuit 5 and the field mean value generating circuit 6 of the arrangement shown in FIG. 10.

It will be appreciated that the components of the automatic iris control shown in FIG. 19 which correspond to those previously described with reference to FIG. 10 are identified by the same reference numerals and operate in a similar manner. Apart from the foregoing, in the circuit of FIG. 19, a data clock CK is supplied from a terminal 65 to drive the first random number generator 61. The second random number generator 62 is driven by a horizontal synchronizing signal HD supplied from a terminal 66, and the output of the second random generator 62 is applied to the first random number generator 61 for initially setting the latter. The output of the first random number generator 61 is applied to the sampling pulse generator 63 which, in turn, provides the sampling pulse to the sampling circuit 64. The data clock CK may be the sampling clock normally employed for sampling the picture elements of the digital video signal and has a frequency a number of times greater than the frequency of the horizontal synchronizing signal.

Figure 20:
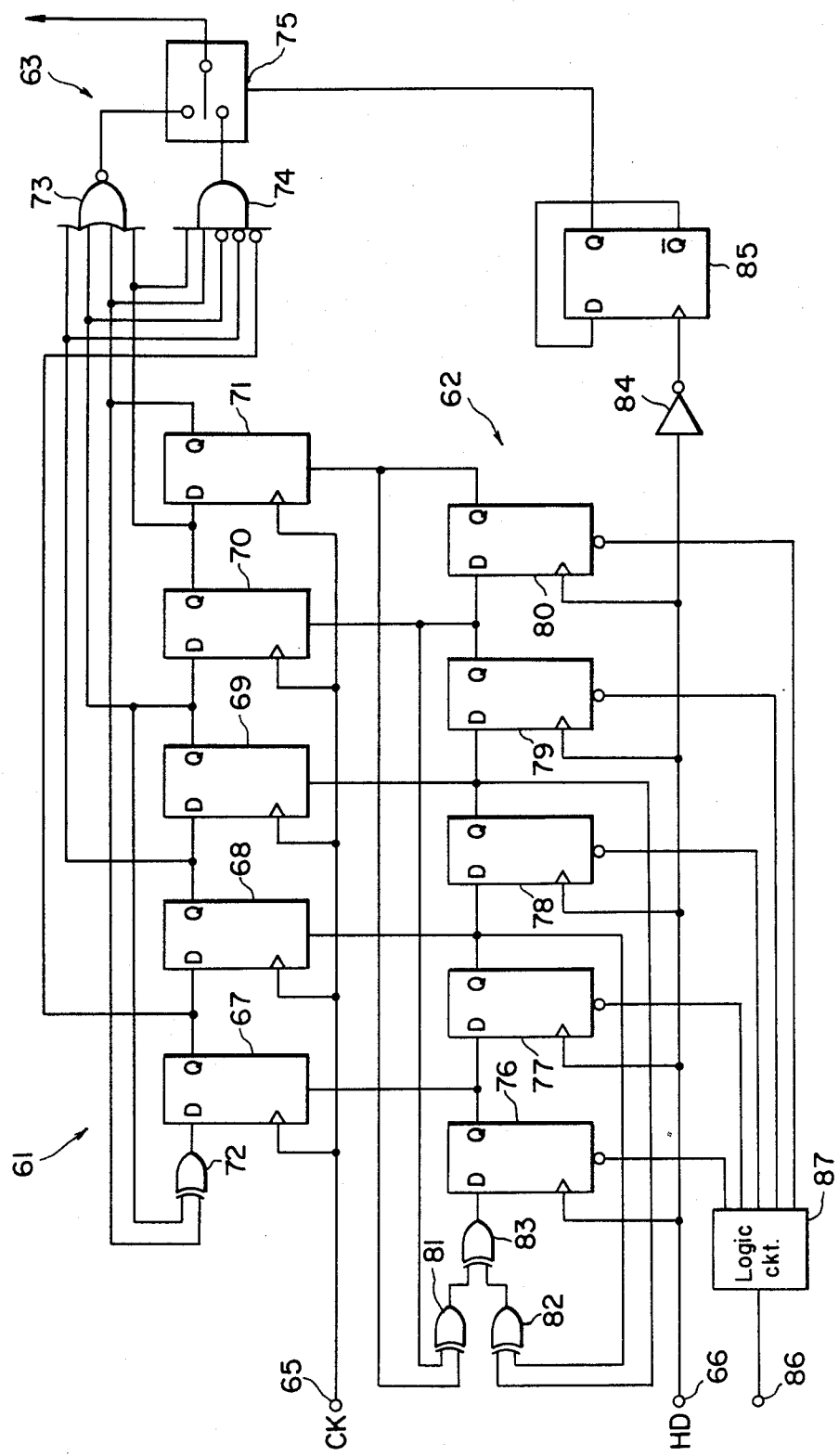
FIG. 20 is a circuit diagram illustrating details of random number generators and a sampling pulse generator that may be used in the circuit of FIG. 19.

Referring now to FIG. 20, it will be seen that, in a desirable detailed arrangement of the random number generators 61 and 62 and the sampling pulse generator 63, the first random number generator 61 includes five D-type flip-flop circuits 67, 68, 69, 70 and 71 which are connected serially, and an exclusive OR circuit 72. Outputs Q of the D-type flip-flop circuits 69 and 71 are connected to the inputs of the exclusive OR circuit 72, and the output of the latter is connected to the D (data) terminal of the flip-flop circuit 67. The outputs Q of the D-type flip-flop circuits 68, 69, 70 and 71 are connected to respective inputs of a NOR circuit 73. The data clock CK is supplied from the terminal 65 to the clock input terminals of the five D-type flip-flops 67–71. With the foregoing arrangement of the first random number generator 61, an m-series pulse having a length of 31 bits is provided by the random number generator 61.

The sampling pulse generator 63 is shown on FIG. 20 to include the NOR-circuit 73, an AND-circuit 74 and a switch circuit 75. The output of either the NOR-circuit 73 or the AND-circuit 74 is selected by the switch circuit 75 and supplied from the latter to the sampling circuit 64 (FIG. 19).

In the specific circuit arrangement of FIG. 20, the second random number generator 62 is shown to include five D-type flip-flop circuits 76, 77, 78, 79 and 80 which are connected serially, and three exclusive-OR circuits 81, 82 and 83. Outputs Q of the D-type flip-flop circuits 79 and 80 are connected to inputs of the exclusive-OR circuit 81, and outputs Q of the D-type flip-flop circuits 77 and 78 are similarly connected to inputs of the exclusive-OR circuit 82. The outputs of the exclusive-OR circuits 81 and 82 are connected to inputs of the exclusive-OR circuit 83 which has its output connected to the D (data) input terminal of the flip-flop circuit 76. The horizontal synchronizing signal HD is supplied from the terminal 66 to the clock input terminals of the D-type flip-flop circuits 76–80 for driving the same. With the foregoing arrangement of the second random number generator 62, the latter generates a second m-series pulse having a length of 31 bits. Since the horizontal synchronizing signal HD is used for driving the D-type flip-flop circuits 76–80, the output of the second random number generator 62 is renewed or repeated in every horizontal period of the video signal. The outputs of the five D-type flip-flop circuits 76, 77, 78, 79 and 80 are supplied to the preset input terminals of the D-type flip-flop circuits 67, 68, 69, 70 and 71, respectively, of the first random number generator 61. The horizontal synchronizing signal HD is further supplied from the terminal 66 to an inverter 84, and the inverted output of the latter is supplied to the clock input terminal of a D-type flip-flop circuit 85 which operates as a ½ frequency divider. Thus, the signal level of an output Q of the frequency divider 85 changes from a high level H to a low level L, or from the low level L to the high level H at each appearance of the horizontal synchronizing signal or clock HD. The output Q from the frequency divider 85 is supplied to the switch circuit 75 for effecting the change-over of the latter, that is, the alternate selection of the output of the NOR-circuit 73 or the output of the AND-circuit 74.

With the arrangement described above, the first random number generator 61 generates the 31 bit code series 1111100011011101010000100101100. The output of the NOR-circuit 73 of the sampling pulse generator 63 is at a high level H when the outputs of the D-type flip-flop circuits 68, 69, 70 and 71 of the first random number generator 61 are all at a low level L, that is, when the four bits signal (0000) is generated. The output of the AND-circuit 74 of the sampling pulse generator 63 is at the high level H when the outputs of the first, second and third D-type flip-flop circuits 67, 68 and 69 are at the low level L and the fourth and fifth D-type flip-flop circuits 70 and 71 have there outputs at the high level H, that is, when the first random number generator 61 generates the five bits signals (11000). These bits patterns (0000) and (11000) are selected so that the maximum distance therebetween is realized when the above noted 31 bits code series is repeatedly generated by the first random number generator 61. As earlier noted, the switch circuit 75 receives the outputs of the NOR-circuit 73 and the AND-circuit 74 and selectively provides one or other of such outputs as a sampling pulse to the sampling circuit 64 in accordance with the control signal or output from the frequency divider 85.

Figure 21:
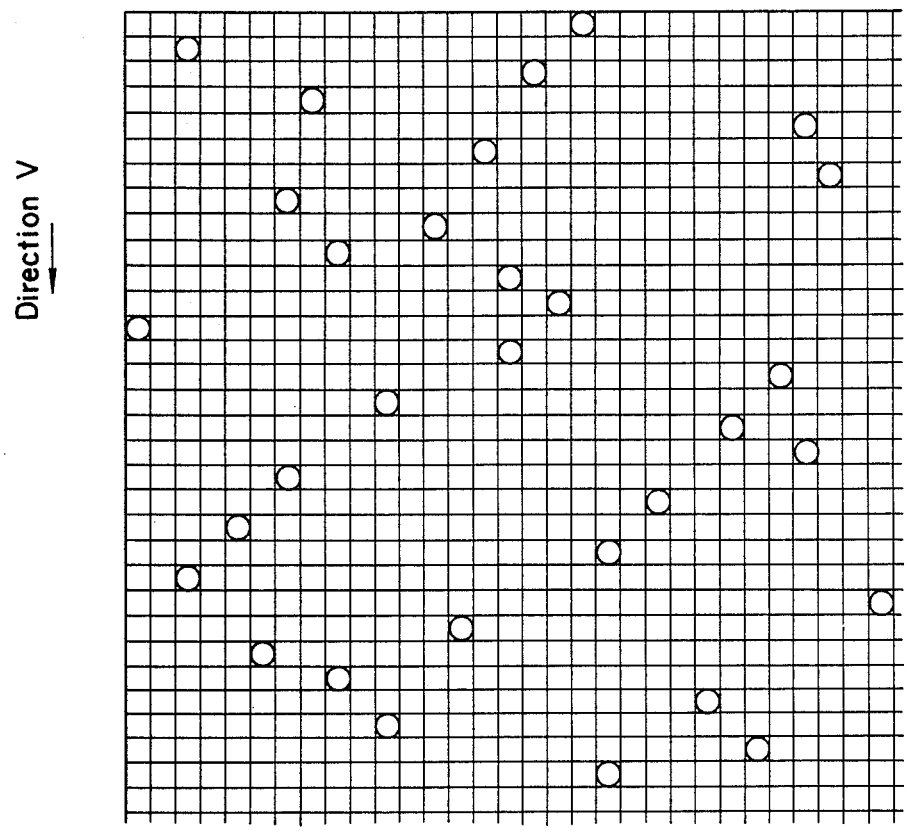
FIG. 21 schematically illustrates the locations of sampling points on a video picture when using the automatic iris control circuit of FIG. 19.

The second code series of 31 bits length which is generated by the second random number generator 62 in response to the horizontal synchronizing signal HD is 1111100100110000101101010001110, and the foregoing bit pattern is repeatedly generated. Five consecutive bits of data in the second code series are supplied from the outputs Q of the D-type flip-flop circuits 76, 77, 78, 79 and 80 as the initial set data for the first random number generator 61. These five consecutive bits of data shift by one bit along the second code series at every horizontal period. Therefore, the thinned-out data sampled by the sampling circuit 64 from the picture elements included in the horizontal and vertical directions within a video picture are as illustrated in FIG. 21.

If an average during a frame period, that is, two successive field periods, is preferred, an odd and even field select signal may be supplied through a terminal 86 to a logic circuit 87 for providing five bits of initial data which are different for the odd and even numbered fields. The five bits of initial data provided by the logic circuit 36 are applied to preset input terminals of the flip-flop circuits 76, 77, 78, 79 and 80 so as to make the address of the sample point in each horizontal line different for the odd and even fields, respectively.

It will be appreciated that, although the detecting or charge-discharge circuit 5 has been described above as functioning as a reference voltage generating circuit, as in the white balance control circuit of FIG. 1, or as a peak detecting circuit, as in the automatic iris control circuit of FIG. 10, such detecting or charge-discharge circuit 5 according to the present invention may be employed in any video or other signal processing circuit which requires a knee or bent characteristic, for example, as in FIGS. 15–18.

More specifically, the detecting or charge-discharge circuit 5 according to this invention may be advantageously employed as a digital low pass filter, for example, as in an automatic black balance control circuit which functions to maintain the black or pedestal levels of the three digital primary color signals R, G and B at the same value. Although color video cameras have been provided with automatic circuits for effecting white balance control, iris control and black balance control, such circuits are independent of each other and employ respective circuit components so that the existing arrangements are relatively inefficient in respect to the size and complexity of the circuits required therefor. It is particularly important that the circuits be minimized and reduced in size if digital signal processing is to be applied to color video cameras provided with automatic white balance control, iris control and black balance control so as to permit the incorporation of such control circuits in an intergrated circuit arrangement. Since the automatic iris control circuit and the automatic white balance control circuit do not need to operate at the same time as the automatic black balance control circuit, in control circuits embodying the present invention, certain components of the black balance control circuit, more specifically, low pass filters thereof are shared with the white balance control circuit and the iris control circuit where they function as a reference voltage generating circuit and a peak detector circuit, respectively.

Figure 22:
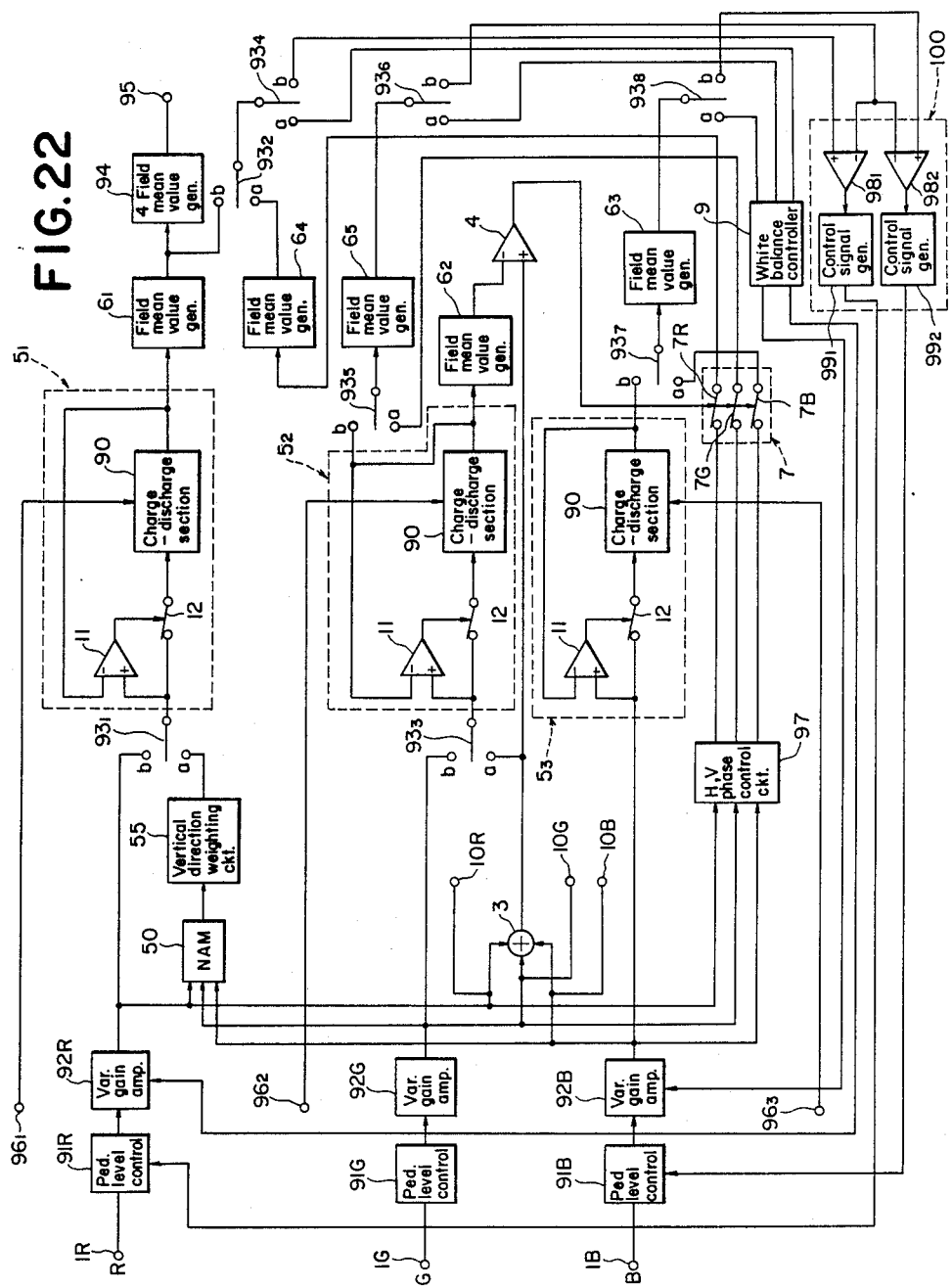
FIG. 22 is a circuit diagram of an automatic control circuit for a color video camera according to still another embodiment of this invention, and which has modes for effecting automatic iris control, white balance control and black balance control, respectively.

Referring in detail to FIG. 22, it will be seen that, in an embodiment of the present invention for effecting automatic control of the iris, white balance and black balance of a digital color video camera, three detecting circuits $5_1$, $5_2$ and $5_3$ are provided, and are each similar to the detecting circuit 5 shown in FIG. 1 or FIG. 10. Thus, each of the circuits $5_1$, $5_2$ and $5_3$ includes, in addition to the specifically illustrated comparator 11 and switch or gate circuit 12, a charge-discharge section 90 which contains the coefficient multipliers 13 and 15 and the adder 14 as illustrated on FIGS. 1 and 10. The digital primary color signals R, G and B provided by the image pick-up device of the color video camera are supplied through input terminals 1R, 1G and 1B to pedestal level control devices, such as, variable level clamping circuits, 91R, 91G and 91B, respectively. The outputs of the pedestal level control devices 91R, 91G and 91B are supplied through variable gain amplifiers 92R, 92G and 92B to respective inputs of an NAM 50 which, as in the case of the similarly numbered element in the automatic iris control circuit of FIG. 10, supplies the primary color signal which has the largest amplitude to a vertical direction weighting circuit 55. The output of the weighting circuit 55 is connected to an input terminal "a" of a switch circuit $93_1$ which has its other input terminal "b" directly connected to the output of the variable gain amplifier 92R. The output of the switch circuit $93_1$ is connected to the input of the detecting circuit $5_1$ which has its output connected to a field mean value generating circuit $6_1$. The output of the field mean value generating circuit $6_1$ is connected directly to an input terminal "b" of a switch circuit $93_2$ and, through a four field mean value generating circuit 94, to an output terminal 95. A control signal for determining the charge-discharge characteristics of the detecting circuit $5_1$ is supplied to the section 90 of the latter through a terminal $96_1$.

In the automatic iris control mode of the circuit shown on FIG. 22, switch circuit $93_1$ is made to engage its input terminal "a", while the switch circuit $93_2$ is disengaged from its input terminal "b". With switch circuits $93_1$ and $93_2$ thus conditioned, the NAM 50, weighting circuit 55, circuit $5_1$ acting as a peak detecting circuit, and field mean value generating circuit $6_1$ act in the same manner as the similarly numbered elements of the automatic iris control circuit of FIG. 10. The output of the circuit $6_1$ constitutes the mean value, for a field of the video signal, of the peak level of the primary color signal of the largest amplitude, and the circuit 94 provides to the output terminal 95 a mean value of such signal for the period of four fields. Thus, the output from the terminal 95 can be used for controlling the iris of the color video camera, for example, such output can be applied ot the non-inverted input of the comparator 56 in the circuit shown on FIG. 10.

For effecting automatic white balance control, the circuit shown on FIG. 22 includes an adder 3 in which the outputs of the variable gain amplifiers 92R, 92G and 92B are equally added to each other. The resulting added output from the adder 3 is supplied to the input terminal "a" of a switch circuit $93_3$, and to the non-inverted input of a comparator 4. The output of the switch circuit $93_3$ is connected to the input of the detecting circuit $5_2$ which has its output connected through a field mean value generating circuit $6_2$ to the inverted input of the comparator 4. The primary color signals from the variable gain amplifiers 92R, 92G and 92B are also supplied through a horizontal and vertical phase control circuit 97 to respective gates or switches 7R, 7G and 7B of a gate switching circuit 7 which is operated or gated by a gating pulse from the comparator 4. The red color signal gated through the gate or switch 7R is supplied through a field mean value generator $6_4$ to the input terminal "a" of the switch circuit $93_2$ which is connected to a switching circuit $93_4$. The green color signal gated through the gate or switch 7G is similarly supplied to the input terminal "a" of a switch circuit $93_5$ having its output connected through a field mean generating circuit $6_5$ to a switch circuit $93_6$, and the blue color signal gated through the switch or gate 7B is supplied to the input terminal "a" of a switch circuit $93_7$ which has its output connected through a field mean value generating circuit $6_3$ to a switch circuit $93_8$.

In the automatic white balance control mode of the circuit ilustrated on FIG. 22, the switches $93_2$–$93_8$ are all made to engage their respective terminals "a". Therefore, in such mode, the detecting circuit $5_2$ acts as a reference voltage generator similar to the circuit 5 in FIG. 1, and the mean value of such reference voltage is compared, in the comparator 4 with the added signal from the adder 3 for providing a gating pulse by which the gate switching circuit 7 is made to gate or pass the approximate peak levels of the red, green and blue color signals. The gated red color signal is field mean averaged in the generating circuit $6_4$ and then passed through the switch circuits $93_2$ and $93_4$ to a respective input of a white balance control circuit 9. Similarly, the gated green color signal is passed through the switching circuit $93_5$ to the field mean value generating circuit $6_5$, and the resulting field mean value thereof is passed through the switching circuit $93_6$ to a respective input of the white balance control circuit 9. Finally, the gated blue color signal is passed through the switch circuit $93_7$ to the field mean value generating circuit $6_3$, and the field mean value obtained from the latter is passed through the switch circuit $93_8$ to a respective input of the white balance control circuit 9. The control circuit 9, as in the case of the similarly numbered circuit in FIG. 1, may be constituted by a central processing unit (CPU) which compares the field mean values of the red and blue color signals with the field mean value of the green color signal and, in accordance therewith, generates white balance correction data supplied to the variable gain amplifiers 92R and 92B for varying the gains thereof so as to equalize the levels of the red and blue color signals from the amplifiers 92R and 92B with the level of the green color signal from the amplifier 92G. As in the white balance control circuit described with reference to FIG. 1, the white balance corrected color signals derived from the outputs of the variable gain amplifiers 92R, 92G and 92B are applied to output terminals 10R, 10G and 10B, respectively. A control signal for controlling the charge-discharge characteristics of the circuit $5_2$ when operating as a reference voltage generating circuit in the white balance control mode is applied to the charge-discharge section 90 of the circuit $5_2$ through a terminal $96_2$.

In the black balance control mode of the circuit according to the embodiment of this invention illustrated on FIG. 22, all of the switches $93_1$–$93_8$ are changed-over to engage their respective terminals "b". In such configuration of the circuit, the red color signal is supplied through the switch circuit $93_1$ to the input of the circuit $5_1$ which, in this case, acts as a digital low pass filter having its frequency characteristics determined by the mode select control signal supplied through the respective terminal $96_1$. In a similar manner, the green color signal is supplied through the switch circuit $93_3$ to the input of the circuit $5_2$ acting as a digital low pass filter having its frequency characteristics determined by the mode select control signal applied to the terminal $96_2$, and the blue color signal is applied directly to the input of the circuit $5_3$ also acting as a digital low pass filter having its frequency characteristics determined by the mode select control signal applied to the respective terminal $96_3$.

The output of the digital low pass filter $5_1$ is supplied to the field mean value generating circuit $6_1$, and the resulting field mean value is supplied through the terminal "b" of the switch $93_2$ to the output of the latter. Similarly, the output of the digital low pass filter $5_2$ is supplied through the switch circuit $95_5$ engaging its terminal "b" to the field mean value generating circuit $6_5$, and the output of the digital low pass filter $5_3$ is supplied through the switch circuit $93_7$ engaging its terminal "b" to the field mean value generating circuit $6_3$. The field mean values of the outputs of the digital low pass filters $5_1$, $5_2$ and $5_3$, as obtained at the output of the switch circuit $93_2$ and the outputs of the field mean value generating circuits $6_5$ and $6_3$, respectively, may be suitably employed for controlling the black balance. For example, as shown schematically on FIG. 22, the field mean value output by the circuit $6_1$ is supplied through the switch circuits $93_2$ and $93_4$ to the non-inverted input of a comparator $98_1$ which, at its inverted input, receives the field mean value output by the circuit $6_5$ and supplied through the switch circuit $93_6$. The field mean value output by the circuit $6_3$ is supplied through the switch circuit $93_8$ to the non-inverted input of a comparator $98_2$ which, at its inverted input, receives the field mean value output by the circuit $6_5$ and supplied through the switch circuit $93_6$. It will be appreciated that the comparators $98_1$ and $98_2$ respectively compare the field mean averaged pedestal levels of the red and blue color signals passing through the digital low pass filters $5_1$ and $5_3$, respectively, with the field mean averaged pedestal level of the green color signal passing through the digital low pass filter $5_2$. The resulting outputs of the comparators $98_1$ and $98_2$ are supplied to control signal generators $99_1$ and $99_2$, respectively, which provide corresponding black balance correction data to the pedestal level control cicuits 91R and 91B, respectively. The comparators $98_1$ and $98_2$ and the control signal generators $99_1$ and $99_2$ combine to form a black balance controller 100 which, as in the case of the white balance controller 9, may be constituted by a central processing unit (CPU) or micro computer. In any case, the control signals applied to the pedestal level control circuits 91R and 91B tend to equalize the pedestal levels of the red and blue color signals with the pedestal level of the green color signal for maintaining the black balance.

It will be appreciated that, in the circuit according to the embodiment of this invention shown on FIG. 22, the detecting circuits $5_1$, $5_2$ and $5_3$ function as digital low pass filters for the red, green and blue color signals in the black balance control mode, and that the circuits $5_1$ and $5_2$ alternatively function as a peak detecting circuit and a reference voltage generating circuit, respectively, in the automatic iris control mode and the white balance control mode, respectively. Thus, the three detecting circuits $5_1$, $5_2$ and $5_3$ are made to perform the functions that would require five similar circuits, that is, three low pass filters, a peak detecting circuit and a reference voltage generating circuit, if an automatic black balance control circuit, an automatic iris control circuit and an automatic white balance control circuit are provided independently of each other. Further, in the case of such independently provided control circuits, one field mean value generating circuit is required for the automatic iris control, four mean value generating circuits are required for the automatic white balance control and four mean value generating circuits are required for the automatic black balance control. In other words, nine mean value generating circuits are required when the automatic iris control circuit, white balance control circuit and black balance control circuit are independent or do not share circuit components, whereas, only the five field mean value generating circuits $6_1$–$6_5$ are required in the circuit according to this invention which is illustrated on FIG. 22. Therefore, the efficiency of the circuit usage is improved so as to facilitate the production of the circuit shown on FIG. 22 as an intergrated circuit. By reason of the resulting reduction of power consumption, the present invention can be readily applied to digital color video cameras.

Although illustrative embodiments of the present invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An automatic control circuit having modes for effecting iris control, white balance control and black balance control, respectively, of a color video camera, which provides three primary color signals, said automatic control circuit comprising:

first, second and third detecting circuits having respective inputs and outputs and each including comparator means for comparing the respective input and output and providing a comparison output in accordance therewith, first multiplying means responsive to said comparison output for multiplying said respective input by a first coefficient and providing a first product output, adding means for adding said first product output to said respective output of the detecting circuit so as to provide an added output, second multiplying means for multiplying said added output by a second coefficient so as to provide a second product output as said respective output, and means for controlling the amounts of said first and second coefficients;

a non-adder-mixer receiving said primary color signals and extracting therefrom the one of said primary color signals having the largest amplitude;

means operative in the iris control mode for applying said one primary color signal from said non-adder-mixer as said input to said first detecting circuit which then functions as a peak detecting circuit;

means operative in the white balance control mode for adding together said three primary color signals and applying the resulting added signal to said second detecting circuit as said input of the latter whereupon said second detecting circuit functions as a reference voltage generating circuit; and means operative in the black balance control mode for applying said three primary color signals as said inputs to said first, second and third detecting circuits, respectively, which function, in said black balance control mode, as first, second and third low pass filters, respectively.

2. An automatic control circuit as in claim 1; further comprising field mean value generating means receiving said output of the first detecting circuit for generating a mean value of the output of the latter for a field period of the video camera when said first detecting circuit functions as a peak detecting circuit in said iris control mode.

3. An automatic control circuit as in claim 2; further comprising second comparator means for comparing said mean value of the output from said peak detecting circuit with a predetermined value and providing a second comparison output, and iris drive control means responsive to said second comparison output from said second comparator means.

4. An automatic control circuit as in claim 1; further comprising field mean value generating means receiving said output of the second detecting circuit for providing a mean value of the output of the latter for a field period of the video camera when said second detecting circuit functions as a reference voltage generating circuit in said white balance control mode, second comparator means for comparing said mean value of the output of said reference voltage generating circuit with said added signal resulting from said adding together of the three primary color signals and providing a second comparison output, gate switching means for gating said three primary color signals in response to said second comparison output, and means for controlling relative gains of said three primary color signals in accordance with the three primary color signals as gated by said gate switching means.

5. An automatic control circuit as in claim 1; further comprising first, second and third field mean value generating means respectively receiving the outputs of said first, second and third detecting circuits functioning as low pass filters for generating mean values of the outputs of said low pass filters for a field period of the video camera and by which black balance control can be effected.

6. A video signal processing circuit comprising:

video signal control means for varying a characteristic of a video signal;

a detecting circuit receiving an input from said video signal control means for providing an output in correspondence to the video signal; and control signal generating means connected to said detecting circuit for generating a control signal for said video signal control means in response to said output from said detecting circuit;

said detecting circuit including comparator means for comparing said input and output of said detecting circuit and providing a comparison output in accordance therewith, first multiplying means responsive to said comparison output for multiplying said input by a first coefficient to provide a first product output, adding means for adding said first product output to said output of the detecting circuit so as to provide an added output, second multiplying means for multiplying said added output by a second coefficient so as to provide said output of the detecting circuit as the product of said added output and said second coefficient, and means for controlling the amounts of said first and second coefficients.

7. A video signal processing circuit as in claim 6; in which said detecting circuit generates a reference voltage as said output therefrom, said video signal control means are operative to control white balance of the video signal, and said control signal generating means is responsive to said reference voltage and said video signal from said video signal control means.

8. A video signal processing circuit as in claim 7; in which said video signal control means includes a plurality of variable gain amplifiers receiving primary color signals, respectively, and an adder receiving outputs of said variable gain amplifiers and adding the same in an equal ratio.

9. A video signal processing circuit as in claim 8; in which said control signal generating means includes second comparator means comparing said reference voltage with the output from said adder which adds the outputs of the variable gain amplifiers and providing a corresponding second comparison output, 2D-delay means delaying said comparison output from said second comparator means with D being a predetermined time shorter than a peak in said comparison output, 2H-delay means in which H is a horizontal period, means connecting said 2H-delay means to said 2D-delay means, series connected 1H- and 1D-delay means connected to each of said variable gain amplifiers, gate switching means connected to said 1H-and 1D-delay means connected in series with each of said variable gain amplifiers and being operative to gate the outputs of said gain controlled amplifiers in response to an output of said 2H-delay means, and means responsive to the gated outputs of said gain controlled amplifiers for controlling the gains of the latter relative to each other.

10. A video signal processing circuit as in claim 8; in which said control signal generating means includes field mean value generating means receiving said output of the detecting circuit for providing a mean value thereof for a field period of the video signal, second comparator means for comparing said mean value of the output of said detecting circuit with said added signal resulting from said adding together of the primary color signals and providing a second comparison output, gate switching means for gating said primary color signals in response to said second comparison output, and means for controlling relative gains of said primary color signals in accordance with the primary color signals as gated by said gate switching means.

11. A video signal processing circuit as in claim 10; in which said field mean value generating means include delay means providing a delay of one field period to said output from the detecting circuit, and adder means adding said output directly from said detecting circuit to said output as delayed one field-period by said delay means.

12. A video signal processing circuit as in claim 6; further comprising field mean value generating means receiving said output of the detecting circuit for generating a mean value of the output of the latter for a field period of the video signal so that said detecting circuit functions as a peak detector in an iris control circuit.

13. A video signal processing circuit as in claim 12; further comprising second comparator means for comparing said mean value of the output from said peak detector with a predetermined value and providing a second comparison output, and iris drive control means responsive to said second comparison output from said second comparator means.

14. A video signal processing circuit as in claim 13; in which the video signal includes primary color signals; and in which said video signal control means includes non-adder-mixer means selecting the one of said primary color signals having the largest amplitude as the input to said detecting circuit functioning as a peak detector.

15. A video signal processing circuit as in claim 14; further comprising vertical direction weighting means connected to said non-adder-mixer means for weighting said input to the detecting circuit.

16. A video signal processing circuit as in claim 15; in which said control signal generating means further includes level control means connected between said peak detector and said field mean value generating means for varying the DC level of the output of said peak detector in accordance with an externally applied control signal.

17. A video signal processing circuit as in claim 15; in which said control signal generating means further includes thinning-out means connected between said peak detector and said field mean value generating means for thinning-out the output data from said peak detector.

18. A video signal processing circuit as in claim 17; in which said thinning-out means includes first and second random number generating means, means for generating sampling pulses in response to numbers from said first and second random number generating means, and sampling means for sampling said output data from said peak detector in response to said sampling pulses.

19. A video signal processing circuit as in claim 6; in which said detecting circuit is constituted by a digital circuit.

20. A video signal processing circuit as in claim 6; in which said first multiplying means for multiplying by said first coefficient includes switch circuit means.

21. A video signal processing circuit as in claim 20; in which said second multiplying means for multiplying by said second coefficient includes switch circuit means and adder means.

22. A video signal processing circuit as in claim 21; in which said adding means for adding said first product output to said output of the detecting circuit includes a counter and an adder.

* * * * *